US008902049B2

(12) United States Patent
Fushimi et al.

(10) Patent No.: US 8,902,049 B2
(45) Date of Patent: Dec. 2, 2014

(54) LIGHTING REMOTE CONTROL SYSTEM

(75) Inventors: Shigemi Fushimi, Hirakata (JP); Hiroki Noguchi, Sanda (JP); Shinichi Abe, Kadoma (JP); Saori Ueno, Osaka (JP); Makoto Hasuo, Suita (JP)

(73) Assignee: Panasonic Corporation, Osaka (JP)

(*) Notice: Subject to any disclaimer, the term of this patent is extended or adjusted under 35 U.S.C. 154(b) by 699 days.

(21) Appl. No.: 13/113,319

(22) Filed: May 23, 2011

(65) Prior Publication Data

US 2011/0285515 A1 Nov. 24, 2011

(30) Foreign Application Priority Data

May 24, 2010 (JP) ................................. 2010-118812

(51) Int. Cl.
*G06F 3/033* (2013.01)
*G09G 5/08* (2006.01)
*H05B 37/02* (2006.01)

(52) U.S. Cl.
CPC .................................. *H05B 37/0272* (2013.01)
USPC ........................................ 340/12.22; 362/233

(58) Field of Classification Search
None
See application file for complete search history.

(56) References Cited

U.S. PATENT DOCUMENTS

2008/0186720 A1* 8/2008 Verbrugh ...................... 362/383

FOREIGN PATENT DOCUMENTS

JP 6-314507 11/1994
JP 2010-257742 11/2010

OTHER PUBLICATIONS

Translation of JPO Office Action for application 2010-118812; JPO (via USPTO STIC (Scientific and Technical Information Center translation); Original version drafted Nov. 1, 2013 and translated May 8, 2014.*

Lighting System (JPO patent application translation); Publication JP2010-257742 (USPTO STIC (Scientific and Technical Information Center translation). Publication date Nov. 11, 2010.*

Office Action dated Nov. 12, 2013 issued in corresponding Japanese application No. 2010-118812.

* cited by examiner

*Primary Examiner* — Brian Zimmerman
*Assistant Examiner* — Cal Eustaquio
(74) *Attorney, Agent, or Firm* — Bacon & Thomas, PLLC

(57) ABSTRACT

A lighting remote control system includes an illuminating device for irradiating illumination light in a changeable direction, a remote controller for irradiating visible light, a direction sensor for detecting an irradiating direction of the visible light based on a posture of the remote controller, and a position sensor for detecting position coordinates of the remote controller. The illuminating device is designed to irradiate the illumination light on a position specified pursuant to the position coordinates of the remote controller detected by the position sensor, the irradiating direction of the visible light detected by the direction sensor and an arbitrarily-set unit length.

4 Claims, 20 Drawing Sheets

L0: POSITION COORDINATES OF ILLUMINATING DEVICE

R0: POSITION COORDINATES OF REMOTE CONTROLLER vL: DIRECTION ANGLE OF ILLUMINATING DEVICE (UNIT VECTOR)

v0: DIRECTION ANGLE OF REMOTE CONTROLLER (UNIT VECTOR)

$\vec{L0}$, $\vec{L02}$, $\vec{L03}$, $\vec{L04}$, $\vec{L05}$: POSITION COORDINATES OF ILLUMINATING DEVICE $\vec{R0}$: POSITION COORDINATES OF REMOTE CONTROLLER $\vec{vL1}$, $\vec{vL2}$, $\vec{vL3}$: DIRECTION ANGLE OF ILLUMINATING DEVICE (UNIT VECTOR)

$\vec{v0}$: DIRECTION ANGLE OF REMOTE CONTROLLER (UNIT VECTOR)

L0, L02: POSITION COORDINATES OF LIGHT SOURCE
R0: POSITION COORDINATES OF REMOTE CONTROLLER vL1, vL2 : DIRECTION ANGLE OF LIGHT SOURCE (UNIT VECTOR)
v0: DIRECTION ANGLE OF REMOTE CONTROLLER (UNIT VECTOR)

LIGHTING REMOTE CONTROL SYSTEM

FIELD OF THE INVENTION

The present invention relates to a lighting remote control system including an illumination device with a changeable irradiating direction of illumination light.

BACKGROUND OF THE INVENTION

Conventionally, there is known a lighting remote control system in which a photodetector is provided at a movable illuminating device with a light emitter arranged at a remote controller. The photodetector detects the light emitted from the light emitter. The illuminating device is automatically turned toward the light-emitting direction (see, e.g., Japanese Patent Application Publication No. H6-314507). This remote control system is used for illumination of a studio of a stage or other places and can be effectively used when a user holds a remote controller and is an illumination target. However, the remote control system is not suitable for use when the user is not an illumination target and when the irradiated position of illumination light is designated to an arbitrary position other than the user's position. This makes it difficult to designate the irradiated position of illumination light to an arbitrary position to which the user is hard to gain access.

SUMMARY OF THE INVENTION

In view of the above, the present invention provides a lighting remote control system capable of allowing a user holding a visible-light-irradiating remote controller to easily designate the irradiated position of illumination light to an arbitrary position spaced apart from the user.

In accordance with an embodiment of the invention, there is provided a lighting remote control system, including: an illuminating device for irradiating illumination light in a changeable direction; a remote controller for irradiating visible light; a direction sensor for detecting an irradiating direction of the visible light based on a posture of the remote controller; and a position sensor for detecting position coordinates of the remote controller, wherein the illuminating device is designed to irradiate the illumination light on a position specified based on the position coordinates of the remote controller detected by the position sensor, the irradiating direction of the visible light detected by the direction sensor and an arbitrarily-set unit length.

The system may further include a calculation unit for finding an irradiating angle of the illumination light based on the position coordinates of the remote controller, the irradiating direction of the visible light and the unit length.

The remote controller may include a setting part for enabling a user to arbitrarily set the unit length.

With the lighting remote control system of the present invention, the illumination light is irradiated on the position specified pursuant to the direction indicated by the visible light of a user-held remote controller, the position coordinates of the remote controller and the unit length set arbitrarily. This makes it possible to easily designate the irradiated position of illumination light to an arbitrary position spaced apart from the user and even to a position hardly accessible by the user.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

A lighting remote control system according to one embodiment of the present invention will now be described with reference to the accompanying drawings which form a part hereof.

Figure 1:
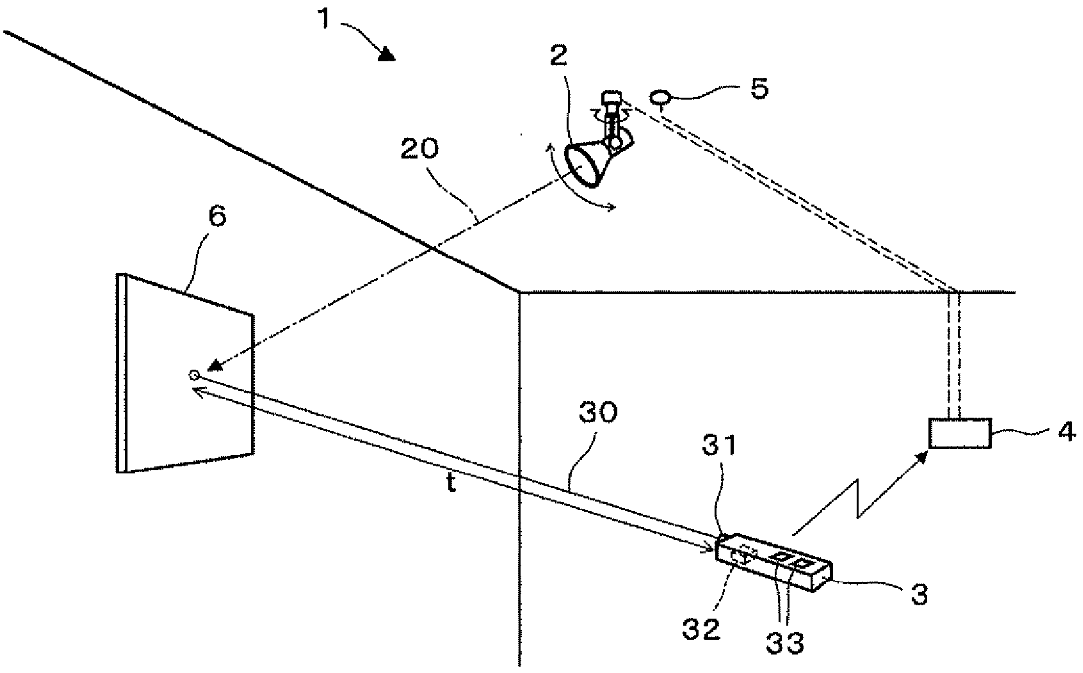
FIG. 1 is a perspective view showing a lighting remote control system according to one embodiment of the present invention.

Referring to FIG. 1, the lighting remote control system 1 is installed in an indoor area of a house or the like and includes an illuminating device 2 in which the irradiating direction of illumination light can be changed about two axes of panning (horizontal angular rotation) and tilting (vertical angular rotation). The illuminating device 2 is used for spot lighting and may be single or multiple in number.

The irradiating direction of illumination light is remote controlled by a remote controller 3 which is operated by a user. The lighting remote control system 1 includes a remote controller 3 for irradiating visible light, a control device 4 for controlling the illuminating device 2 in response to the operation of the remote controller 3 and a position sensor 5 for detecting the position coordinates of the remote controller 3. The position coordinates of the remote controller 3 are three-dimensional coordinates indicating the position of the remote controller 3 in a specific space such as an indoor space or the like. The position sensor 5 detects the position coordinates of the remote controller 3 by receiving, e.g., ultrasonic waves sent from the remote controller 3.

The remote controller 3 includes a pointer unit 31 for irradiating visible light 30, a direction sensor 32 and a setting unit 33 manipulated by a user. The direction sensor 32 specifies the posture (directional angle) of the remote controller 3 and indirectly detects the irradiating direction of the visible light 30 irradiated from the remote controller 3 on the basis of the specified posture of the remote controller 3. The control device 4 specifies the position to which the illuminating device 2 irradiates the illumination light based on the position coordinates of the remote controller 3 detected by the position sensor 5, the irradiating direction of the visible light 30 detected by the direction sensor 32 and the unit length "t" set arbitrarily. The specified position is spaced apart by the unit length "t" from the position coordinates of the remote controller 3 along the irradiating direction of the visible light 30. The unit length "t" is set by the user manipulating the setting unit 33.

A user operates the remote controller 3 so that the visible light 30 irradiated from the remote controller 3 can indicate the place sought to be spot-lighted by the illuminating device 2, e.g., an illumination target 6 on a wall surface in the present embodiment. Responsive to the signals transmitted from the remote controller 3 and the position sensor 5, the control device 4 performs panning and tilting control of the illuminating device 2 to have the optical axis 20 of the illuminating device 2 directed to the position indicated by the visible light 30. If the position of the illumination target 6 is changed, the position-changed illumination target 6 can be irradiated by light from the lighting device 2 by changing the direction of the remote controller 3 and/or the setting of the unit length "t".

Figure 2:
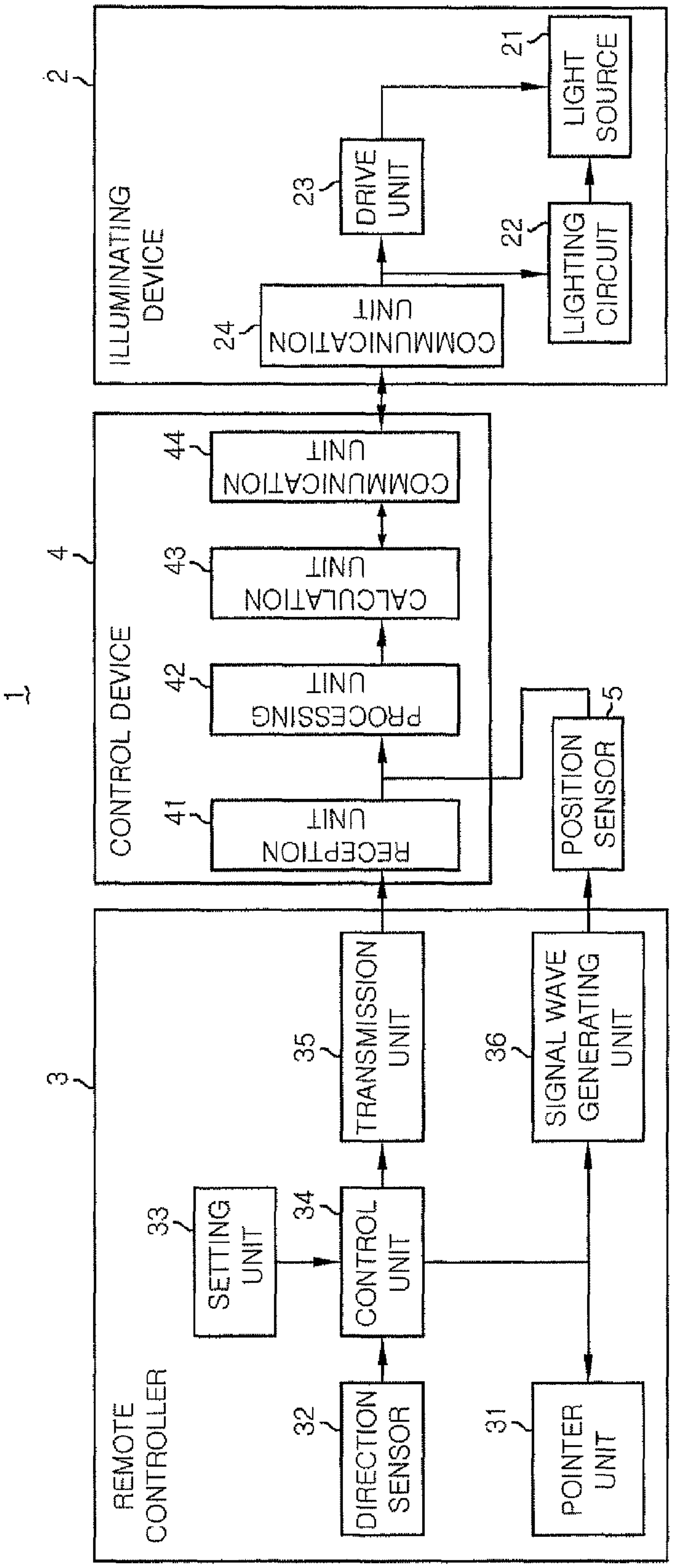
FIG. 2 is a block diagram of the remote control system.

Next, description will be made on the block diagram of the lighting remote control system 1. As shown in FIG. 2, the illuminating device 2 includes a light source 21, a lighting circuit 22 for turning on/off the light source 21, a drive unit 23 for driving the illuminating device 2 or the light source 21 and a communication unit 24 for making communication with the control device 4.

The light source 21 is designed to irradiate illumination light along the direction of the optical axis 20. The light source 21 is, e.g., an organic EL (electroluminescence) element, and may be a LED (light-emitting diode), a fluorescent lamp, a HID (high-intensity discharge lamp), an incandescent lamp or an inorganic EL element. In case of the light source 21 being an organic EL element, the organic EL element may include organic light-emitting layers laminated one above another to emit white light. Alternatively, organic EL elements capable of emitting red light, green light and blue light may be used in combination to generate illumination light of mixed color. The colors of the illumination light of the organic EL element are not limited to red, green and blue colors but may be, e.g., yellow and blue colors.

In case of the light source 21 being a light-emitting diode, it is preferable to use a plurality of light-emitting diodes. In this light source 21, light-emitting diodes capable of emitting red light, green light and blue light may be used in combination to generate illumination light of mixed color or may be used independently. The light color components of the illumination light of the light source 21 may be changed by controlling the electric currents flowing through the respective light-emitting diodes. The colors of the illumination light of the light-emitting diodes are not limited to red, green and blue colors.

In case of the light source 21 being an organic EL element or a light-emitting diode, a suitable number of organic EL elements or light-emitting diodes are arranged within a package depending on the size thereof. The light source 21 may be a module including a housing or a light-transmitting panel (not shown) arranged to surround the organic EL element or light-emitting diodes. The housing is preferably made of a non-brittle material, e.g., a plastic, a composite material composed of a mixture of a plastic and reinforcing filling materials such as glass fibers or the like, a metallic material such as aluminum alloy, iron, magnesium alloy or the like, or wood.

The illuminating device 2 may include an optical member or a reflecting plate (not shown). The optical member may be, e.g., a variety of lenses, a prism, a louver or a filter. The optical member is appropriately used depending on the type of the illuminating device 2. Use is made of a filter having a necessary function selected from the functions of light diffusion, light collection, light polarization, wavelength cut and wavelength conversion. The optical member is composed of, e.g., a light-transmitting plastic, glass or a coated metal plate. Other materials capable of providing the desired optical characteristics may be used as the optical member. The reflecting plate serves to reflect the light coming from the light source 21 toward the irradiated position and includes, e.g., an alumite reflecting plate, an aluminum-deposited reflecting plate, a silver-deposited reflecting plate, a resin reflecting plate or a cold mirror. The reflecting plate has a shape and size capable of providing the desired optical characteristics.

The reflective surface of the reflecting plate may be a mirror surface or a light-diffusing surface.

The lighting circuit 22 is, e.g., an inverter circuit, and is supplied with an electric current from an external power source such as a commercial power source. The lighting circuit 22 turns on the light source 21 by allowing the electric current to flow through the light source 21.

The drive unit 23 is a mechanism for changing the irradiating direction of illumination light. The drive unit 23 includes a motor driver, a drive motor, and a gear unit arranged between the drive motor and a drive shaft. The drive unit 23 serves to rotate the illuminating device 2 or the light source 21 about the drive shaft. The motor driver outputs a drive signal corresponding to the control command received by the communication unit 24, thereby driving the drive motor. The drive motor may be, e.g., an electromagnetic motor, an electrostatic motor, an ultrasonic motor, a spherical motor or a linear motor. During rotation of the drive motor, the rotation direction and rotation angle thereof is controlled by the motor driver.

The communication unit 24 sends and receives data to and from the control device 4 through wire or wireless communication. The wireless communication used herein includes, e.g., visible light communication, infrared data communication standards (IrDA), RF (radio frequency) communication, near field communication standards (IEEE 802.15.1, a registered trademark "Bluetooth") and wireless LAN standards (IEEE 802.11). The wire communication used herein includes, e.g., wire LAN standards (IEEE 802.3 or the like) and power cable communication. The communication unit 24 delivers the received data to the lighting circuit 22 and the drive unit 23. If the data received by the communication unit 24 contain a control command on the flickering, dimming and color temperature of the light source 21, the lighting circuit 22 controls the electric current flowing through the light source 21, thereby adjusting the flickering, dimming and color temperature of the light source 21.

In addition to the components described above, the remote controller 3 further includes a control unit 34 for controlling the operation of the remote controller 3, a transmission unit 35 for transmitting a remote control signal to the control device 4 and a signal wave generating unit 36 for generating signal waves needed to specify the position coordinates of the remote controller 3.

The pointer unit 31 is provided with a light emitting unit, e.g., a laser pointer, for irradiating visible light with increased directivity and is used to indicate the position to which the lighting device 2 irradiates the illumination light. Use of the pointer unit 31 makes it possible for a user to clearly recognize the position to be irradiated within a space and to indicate the same with visible light.

The direction sensor 32 serves to specify the posture of the remote controller 3 within a space, namely the azimuth and tilt angle of the remote controller 3. This makes it possible to detect the irradiating direction of the visible light emitted from the remote controller 3. The direction sensor 32 includes, e.g., a geomagnetic sensor and an acceleration sensor. The geomagnetic sensor measures the azimuth of the remote controller 3 periodically, e.g., every 10 ms. The remote controller 3 specifies the tilt angle thereof by adding up the detected output values of the acceleration sensor every 10 ms. A one-axis sensor, a two-axis sensor or an XYZ three-axis sensor is used as the acceleration sensor.

As the direction sensor 32, a gyrocompass sensor may be used in place of the geomagnetic sensor and the acceleration sensor. The gyrocompass sensor detects the changes in angular velocity caused by the change of the posture of the remote controller 3. The azimuth and tilt angle of the remote controller 3, i.e., the direction angle of the remote controller 3, is specified by adding up the changes in angular velocity. The gyrocompass sensor may be, e.g., an angular velocity sensor, a rotary gyrocompass sensor, a vibratory gyrocompass sensor or an optical-fiber gyrocompass sensor. If necessary, a plurality of gyrocompass sensors may be used as the direction sensor 32.

The setting unit 33 includes at least one switch operated by a user and serves to input the information set by the operation of the switch into the control unit 34. The switch is, e.g., a push button switch but may be a slide switch or other switches. The push button switch is preferably of a capacitance type but may be a resistance type or an optical type. The capacitance type push button switch operates in such a manner that the capacitance thereof is changed by the contact or push of a finger through a resin sheet or the like. Alternatively, the switch may be of a type that the capacitance is changed by the approach of a finger or the like in place of the touch-type mentioned above. The remote controller 3 may include a display unit (not shown), e.g., an LCD (liquid crystal monitor) arranged near the switch. The display unit serves to display, e.g., the contents of switch operation or the information on the illuminating device 2 to be controlled.

The setting unit 33 includes first to seventh setting parts which are functional parts subjected to different user operations. The user can operate the first setting part to allow the pointer unit 31 to irradiate visible light, to supply the transmission unit 35 with the information measured by the direction sensor 32 and the information set by the setting unit 33, and to allow the signal wave generating unit 36 to generate signal waves. The user can operate the second setting part to input an arbitrary number "t" which is used in setting the unit length.

In case where there is provided a plurality of illuminating devices 2, the user can operate the third setting part to select the address or group of the illuminating device 2 to be controlled. If the illuminating device 2 includes a plurality of light sources 21, the user can operate the fourth setting part to select the light source 21 to be controlled. The user can operate the fifth setting part to input the dimming information including the flickering information of the illuminating device 2 or the light source 21 selected by the third setting part or the fourth setting part. The user can operate the sixth setting part to input the color temperature information of the illuminating device 2 or the light source 21 selected by the third setting part or the fourth setting part. The user can operate the seventh setting part to input, as a scene, the combination of the information selected by the third to sixth setting parts. The third to seventh setting parts can be arbitrarily provided in the remote controller 3, some of which may be provided selectively.

The control unit 34 includes a CPU (Central Processing Unit) for performing operations, a ROM (Read Only Memory) for storing control programs and a RAM (Random Access Memory) for storing a variety of control data. The control unit 34 controls the pointer unit 31, the transmission unit 35 and the signal wave generating unit 36 based on the information measured by the direction sensor 32 and the information set by the setting unit 33. The information measured by the direction sensor 32 is subjected to digital signal processing performed by an averaging algorithm in the control unit 34. The digital signal processing is performed to make a signal smoother. The digital signal processing assists in reducing external noises to thereby increase the effective detection accuracy of the direction sensor 32 and in reducing the vibration of the remote controller 3 which may be temporarily generated when the user pushes the switch of the setting unit 33. Reduction of the vibration of the remote controller 3 helps reduce deviation of the optical axis 20 of the irradiated visible light. The control unit 34 may have a power saving mode. The power saving mode is a control mode performed during a standby period in which the setting unit 33 is not operated. The power saving mode assists in reducing the electric power consumed by the CPU.

The transmission unit 35 transmits a remote control signal including the information measured by the direction sensor 32 and the information set by the setting unit 33 to the control device 4 through wireless communication. In the wireless communication, there may be used, e.g., visible light communication, infrared data communication standards, radio frequency communication, near field wireless communication standards and wireless LAN standards. The remote control signal contains, e.g., a start code, transmission information, an error detection code and an end code in the named order. The transmission information includes, e.g., the arbitrary number "t", the azimuth and tilt angle of the remote controller 3, the ID of the remote controller 3, the group of the illuminating devices to be controlled, the addresses of the illuminating devices, the addresses of the light sources, the dimming information including the flickering information, and the color temperature information. The remote control signal is transmitted at a speed of, e.g., about 19.2 kbps and in an interval of, e.g., about 100 ms.

The signal wave generating unit 36 generates ultrasonic waves as the signal waves. The ultrasonic waves thus generated are received by the position sensor 5. In place of the ultrasonic waves, infrared rays, visible light or electric waves may be used as the signal medium of the signal waves. The remote controller 3 may include a plurality of signal wave generating units 36 and may use different kinds of signal media.

The position sensor 5 is an ultrasonic array sensor that specifies the position coordinates of the remote controller 3 by using the ultrasonic waves received from the signal wave generating unit 36 of the remote controller 3. The position sensor 5 is installed in, e.g., the ceiling, independently of the illuminating device 2 and the control device 4 so that it can watch the indoor area. The position sensor 5 may be installed on the wall or the bottom floor insofar as it can detect the position coordinates of the remote controller 3.

The ultrasonic array sensor includes, e.g., a substrate and three or more piezoelectric elements mounted on the substrate in an array shape. The piezoelectric elements convert the ultrasonic waves received from the signal wave generating unit 36 to electric signals by virtue of a piezoelectric effect. The electric signals thus converted are outputted as an image analog signal which in turn is converted to a digital signal through A/D conversion. Using the digital signal, the position sensor 5 calculates the propagation time taken until it receives the ultrasonic waves from the signal wave generating unit 36. Thus, the position sensor 5 acquires a distance image and specifies the position coordinates of the remote controller 3 using the principle of trilateration.

In place of the ultrasonic array sensor, a complementary metal oxide semiconductor (CMOS) image sensor may be used as the position sensor 5. The CMOS image sensor includes three or more light-receiving elements of array shape for converting light to electric signals. The light-receiving elements convert the light pulse signal waves received from the signal wave generating unit 36 to electric signals by virtue of a photoelectric effect. The electric signals thus converted are outputted as an image digital signal. Using the digital signal, the position sensor 5 calculates the propagation time taken until it receives the ultrasonic waves from the signal wave generating unit 36. Thus, the position sensor 5 acquires a distance image and specifies the position coordinates of the remote controller 3 using the principle of trilateration.

A GPS (Global Positioning System) is generally used as a system for specifying a position. The position sensor 5 of the present embodiment is capable of specifying the position coordinates of the remote controller 3 within an indoor area where it is difficult to receive electric waves from GPS satellites. The accuracy of specifying the position coordinates in the position sensor 5 is higher than that of the GPS (a civil GPS has an error of about several meters to ten meters).

The control device 4 includes a reception unit 41 for receiving the remote control signal transmitted from the remote controller 3, a processing unit 42, a calculation unit 43 and a communication unit 44 for making communication with the illuminating device 2.

The reception unit 41 receives the remote control signal transmitted in a wireless manner and transfers the received remote control signal to the processing unit 42. The reception unit 41 may be provided with a sound output unit for outputting a sound. In this case, the sound output unit generates an answerback sound when the remote control signal is received by the reception unit 41.

The processing unit 42 includes a storage unit (not shown) for storing various kinds of processing data. Examples of the processing data include the position coordinate data of the specific space in which the lighting remote control system 1 is arranged, the position coordinate data of the illuminating device 2, the light source 21 and the position sensor 5, and the control contents of the illuminating device 2. The position coordinate data of the specific space may be either the coordinate data of the actually-existing floor, wall and ceiling or the coordinate data of a virtual space. In case where there exists a plurality of illuminating devices 2, the position coordinate data of the illuminating devices 2 are stored in the storage unit in a matching relationship with the addresses of the illuminating devices 2.

The processing unit 42 specifies a position in a specific space based on the azimuth and tilt angle of the remote controller 3 measured by the direction sensor 32, the arbitrary number "t" set by the setting unit 33 and the position coordinates of the remote controller 3 detected by the position sensor 5. The azimuth and tilt angle of the remote controller 3 means the direction indicated by the remote controller 3, namely the direction in which the remote controller 3 irradiates visible light. The position thus specified is spaced apart from the position coordinates of the remote controller 3 by a unit length "t" in the irradiating direction of visible light. Pursuant to the position thus specified, the processing unit 42 properly selects the drive control contents for controlling the drive unit 23 of the illuminating device 2 and the control contents for controlling the flickering, dimming and color temperature of the light source 21. In case where there is provided a plurality of illuminating devices 2, the processing unit 42 specifies the illuminating devices 2 to be controlled. These processing results are sent from the processing unit 42 to the calculation unit 43 as signals.

Responsive to the signal sent from the processing unit 42, the calculation unit 43 calculates the irradiating angle of illumination light of the illuminating device 2 with respect to the position specified by the processing unit 42, namely the position spaced apart from the position coordinates of the remote controller 3 by a unit length "t" in the irradiating direction of visible light. Based on the irradiating angle thus calculated, the calculation unit 43 generates a drive control signal for driving the drive unit of the illuminating device 2 and transmits the drive control signal to the target illuminating device 2 through the communication unit 44. If the signal received from the processing unit 42 contains the data on the flickering, dimming and color temperature of the light source 21, the data are transmitted to the target illuminating device 2 through the communication unit 44.

The processing unit 42 and the calculation unit 43 include a CPU for performing data processing, calculations and other tasks. The functions assigned to the control unit 34 of the remote controller 3 and to the processing unit 42 and the calculation unit 43 of the control device 4 is not limited to the above but may be changed appropriately.

The communication unit 44 making bidirectional communication with the illuminating device 2 transmits the data received from the calculation unit 43 to the illuminating device 2 through wire or wireless communication and delivers the data received from the illuminating device 2 to the calculation unit 43. In the wireless communication, there may be used visible light communication, infrared data communication standards, radio frequency communication, near field communication standards and wireless LAN standards, for example. In the wire communication, there may be used wire LAN standards and power cable communication, for example. The processing unit 42, the calculation unit 43 and the communication unit 44 may be provided independently of one another or may be mounted on the same substrate.

First Modified Example

Figure 3:
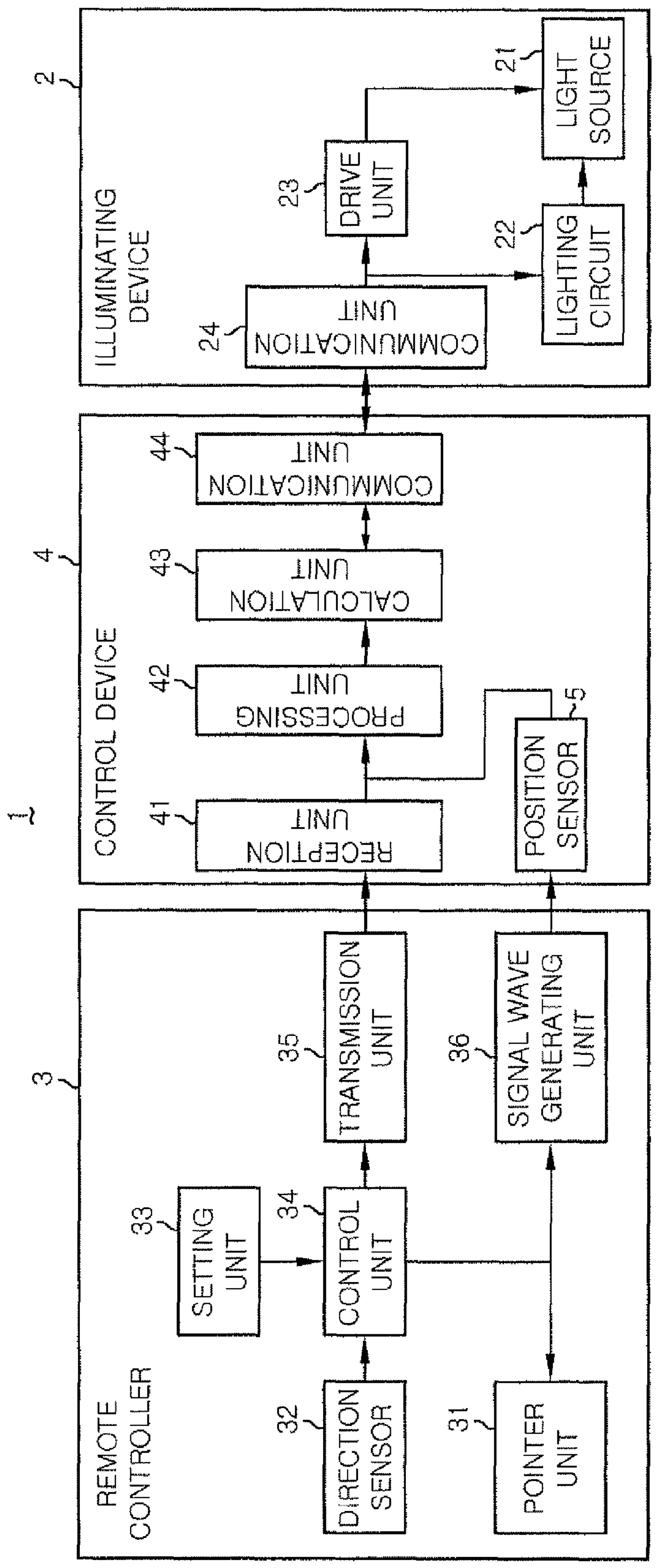
FIG. 3 is a block diagram showing a lighting remote control system according to a first modified example of the present embodiment.

Description will now be made on modified examples of the lighting remote control system 1 of the present embodiment. In a first modified example shown in FIG. 3, the position sensor 5 is integrally provided in the control device 4. This makes it possible to shorten the wiring line interconnecting the position sensor 5 and the control device 4.

Second Modified Example

Figure 4:
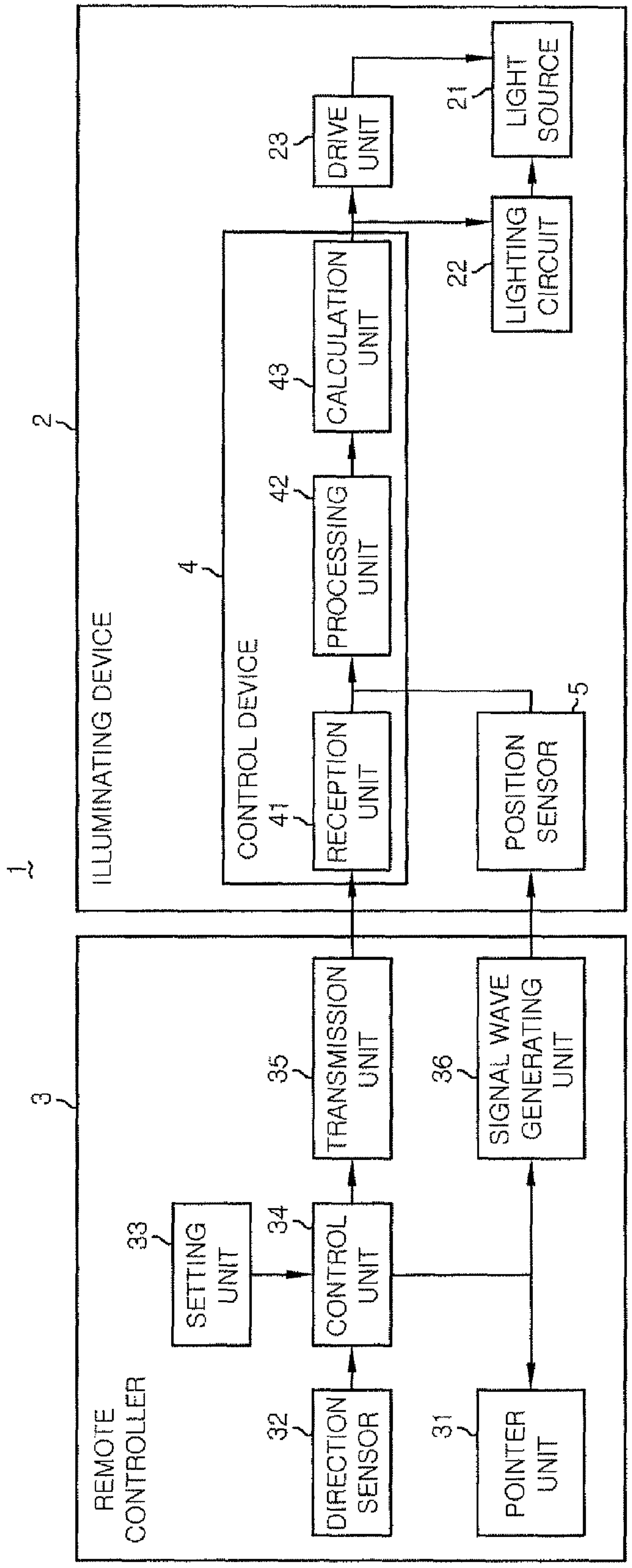
FIG. 4 is a block diagram showing a lighting remote control system according to a second modified example of the present embodiment.

In the second modified example shown in FIG. 4, the control device 4 and the position sensor 5 are integrally provided in the illuminating device 2. In this modified example, the illuminating device 2 is an illuminating device 2 with a sensor function. This makes it possible to omit the communication unit 44 of the control device 4 and the communication unit 24 of the illuminating device 2.

Third Modified Example

Figure 5:
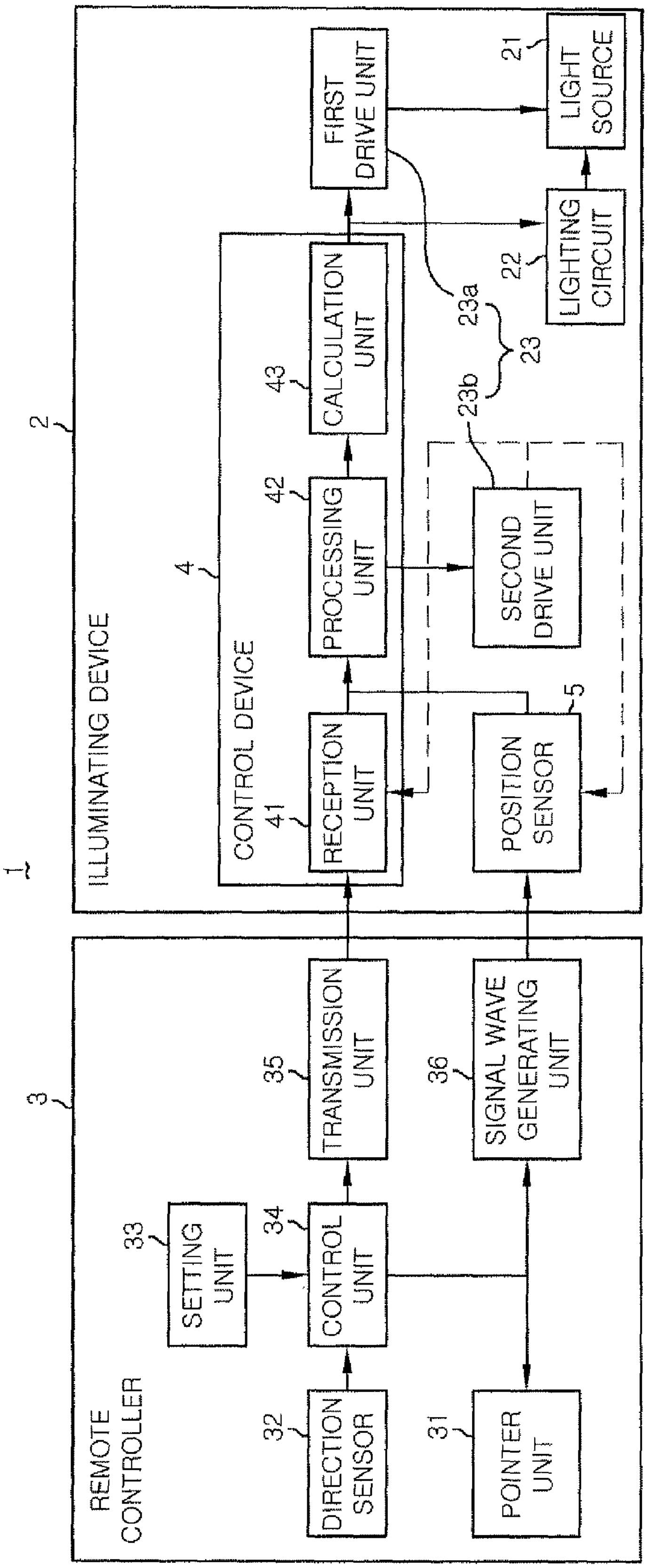
FIG. 5 is a block diagram showing a lighting remote control system according to a third modified example of the present embodiment.

In the third modified example shown in FIG. 5, the illuminating device 2 includes, as the drive unit 23, a first drive unit 23*a* for driving the light source 21 and a second drive unit 23*b* for driving the reception unit 41 and the position sensor 5. Since the reception unit 41 is driven by the second drive unit 23*b*, it can receive the signal transmitted from the transmission unit 35 over a broad range. Inasmuch as the position sensor 5 is driven by the second drive unit 23*b*, it can detect the signal waves sent from the signal wave generating unit 36 over a broad range.

Fourth Modified Example

Figure 6:
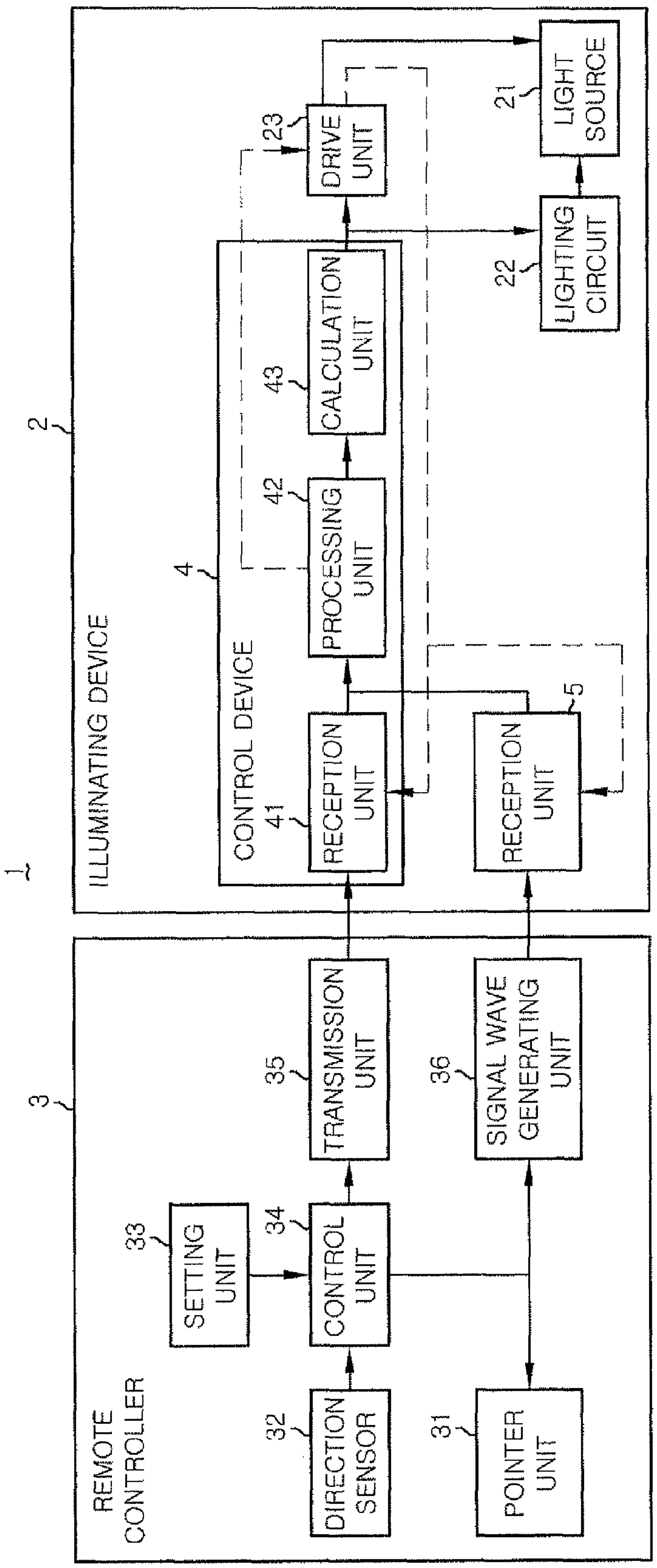
FIG. 6 is a block diagram showing a lighting remote control system according to a fourth modified example of the present embodiment.

In the fourth modified example shown in FIG. 6, the illuminating device 2 is designed so that the light source 21, the reception unit 41 and the position sensor 5 can be driven by the same drive unit 23. This is cost-effective as compared with the case where the first and second drive units are provided as the drive unit 23.

Fifth Modified Example

Figure 7:
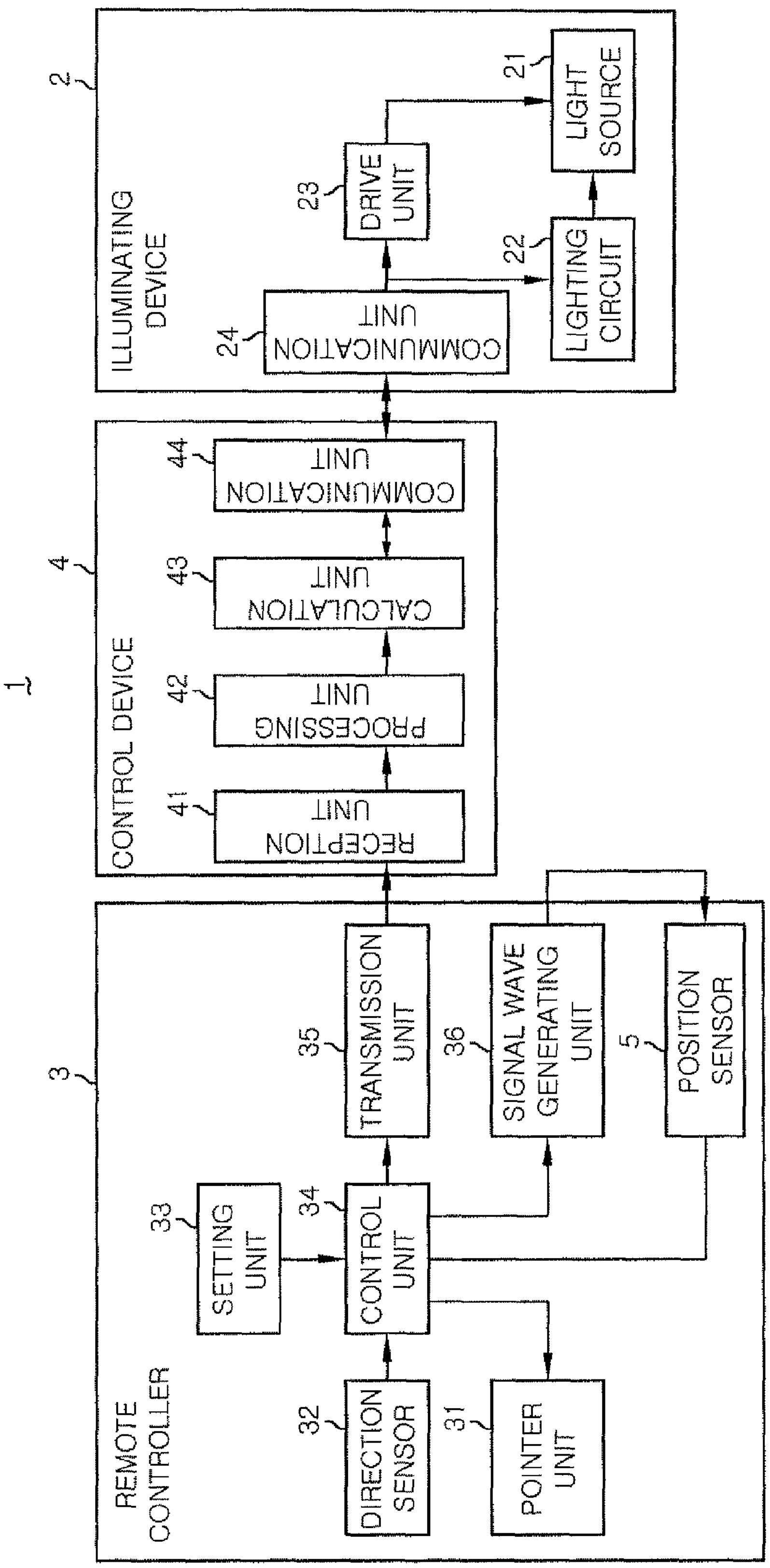
FIG. 7 is a block diagram showing a lighting remote control system according to a fifth modified example of the present embodiment.

In the fifth modified example shown in FIG. 7, the position sensor 5 is provided in the remote controller 3. The position sensor 5 measures the distance between the remote controller 3 and the floor, the wall or the ceiling around the remote controller 3, thereby specifying the position coordinates of the remote controller 3 in a specific space.

The remote controller 3 includes, e.g., the signal wave generating unit 36 and the position sensor 5 formed of an array sensor for receiving ultrasonic waves. The position sensor 5 receives the ultrasonic waves generated from the signal wave generating unit 36, reflected by the floor, the wall and the ceiling around the remote controller 3 and then returned back to the remote controller 3. Based on the propagation time taken until the ultrasonic waves generated from the signal wave generating unit 36 are received by the position sensor 5, the remote controller 3 calculates the distance between itself and the floor, the wall and the ceiling and specifies the position coordinates thereof using the principle of trilateration. A CMOS image sensor may be used as the position sensor 5, in which case the signal wave generating unit 36 generates light pulse signal waves.

Sixth Modified Example

Figure 8A:
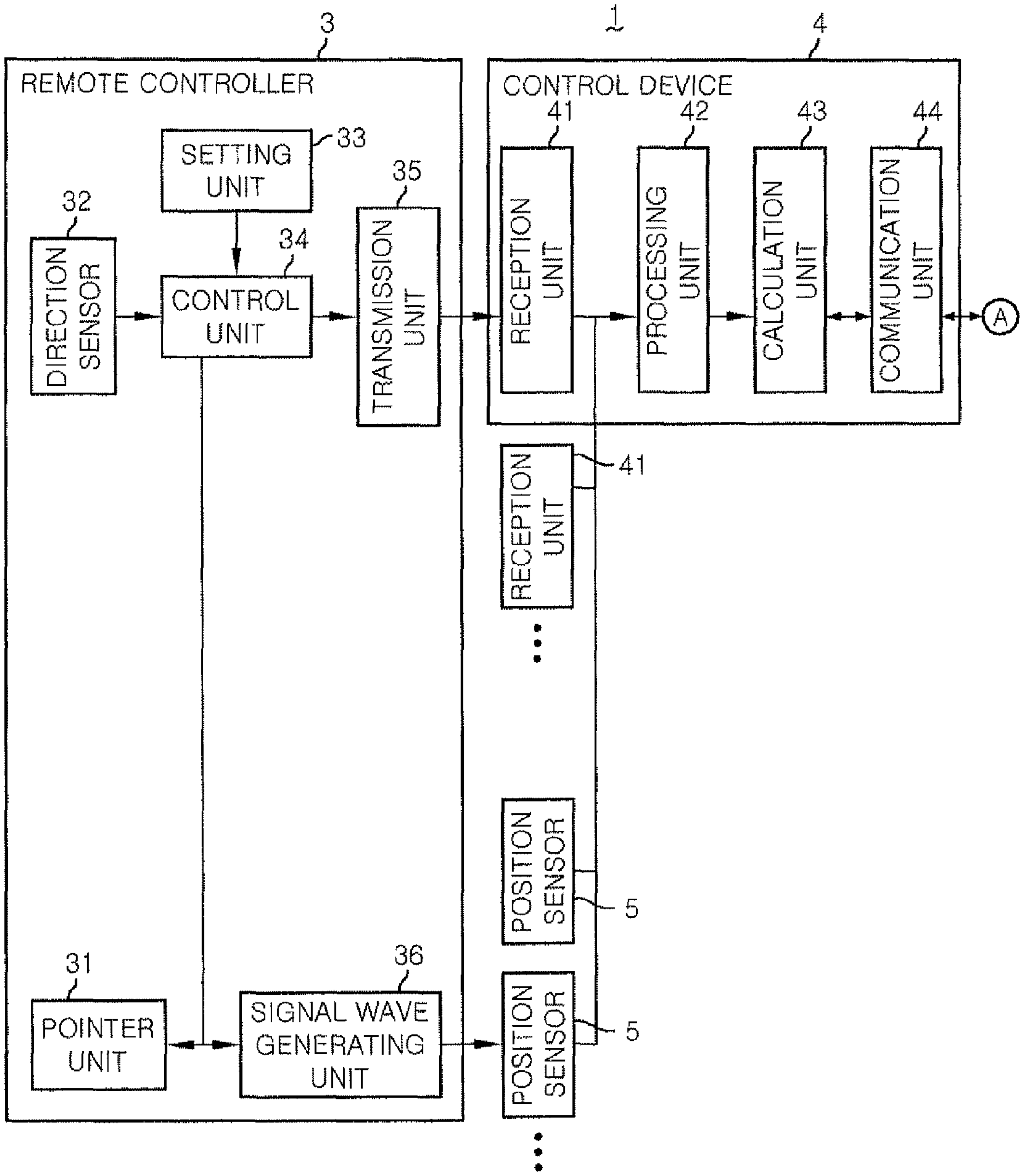
FIGS. 8A and 8B are block diagrams showing a lighting remote control system according to a sixth modified example of the present embodiment.
Figure 8B:
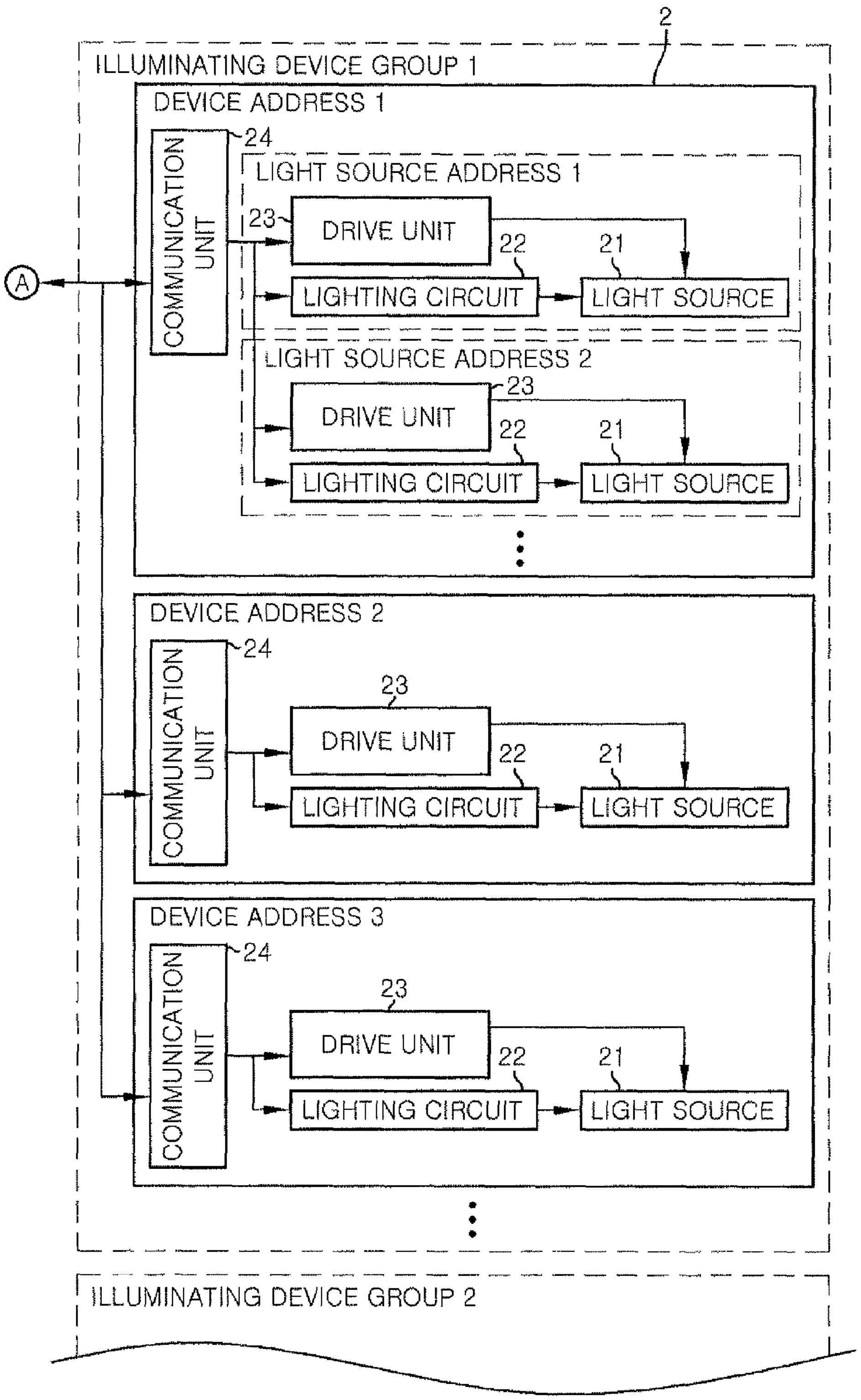

In the sixth modified example shown in FIGS. 8A and 8B, the lighting remote control system 1 includes a plurality of position sensors 5. Use of the plurality of position sensor 5 enables the remote control system 1 to detect the signal waves generated from the signal wave generating unit 36 over a broad range, thereby making it possible to eliminate the blind area from the position sensor 5. The control device 4 is provided with a plurality of reception units 41 and is capable of receiving the signal transmitted from the transmission unit 35 of the remote controller 3 over a broad range.

The lighting remote control system 1 includes a plurality of illuminating devices 2, each of which has an address used for specifying a control target. Each of the illuminating devices 2 includes a plurality of light sources each of which has an address used for specifying a control target. The illuminating devices 2 may be divided into a number of illuminating device groups each including a plurality of illuminating devices 2. In this case, the illuminating devices 2 are specified as a control target on a group-by-group basis.

The operation of the lighting remote control system 1 of the present embodiment will now be described with reference to FIGS. 9 to 10B.

Figure 9:
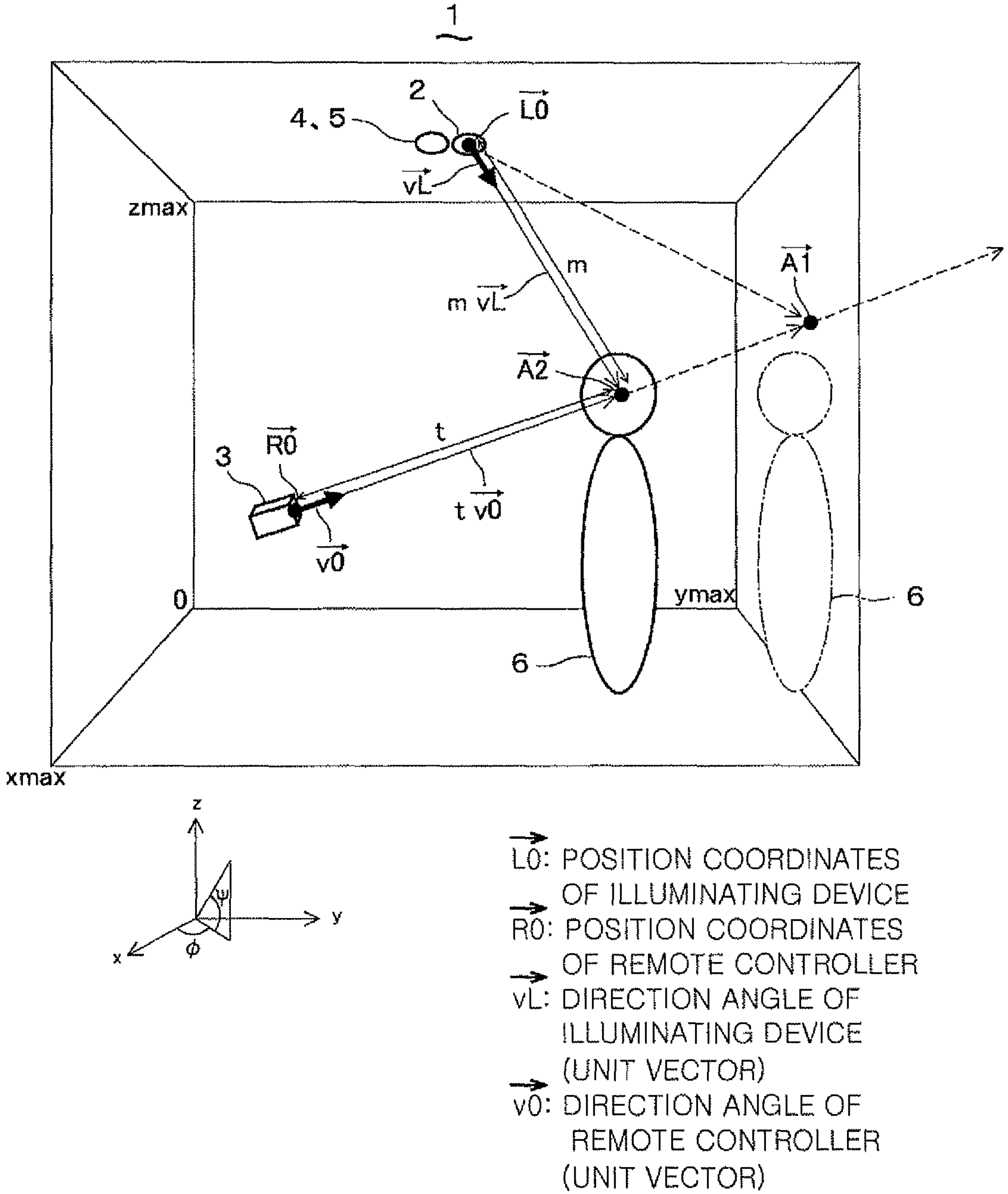
FIG. 9 is a perspective view illustrating the operation of the lighting remote control system according to one embodiment of the present invention.
Figure 10A:
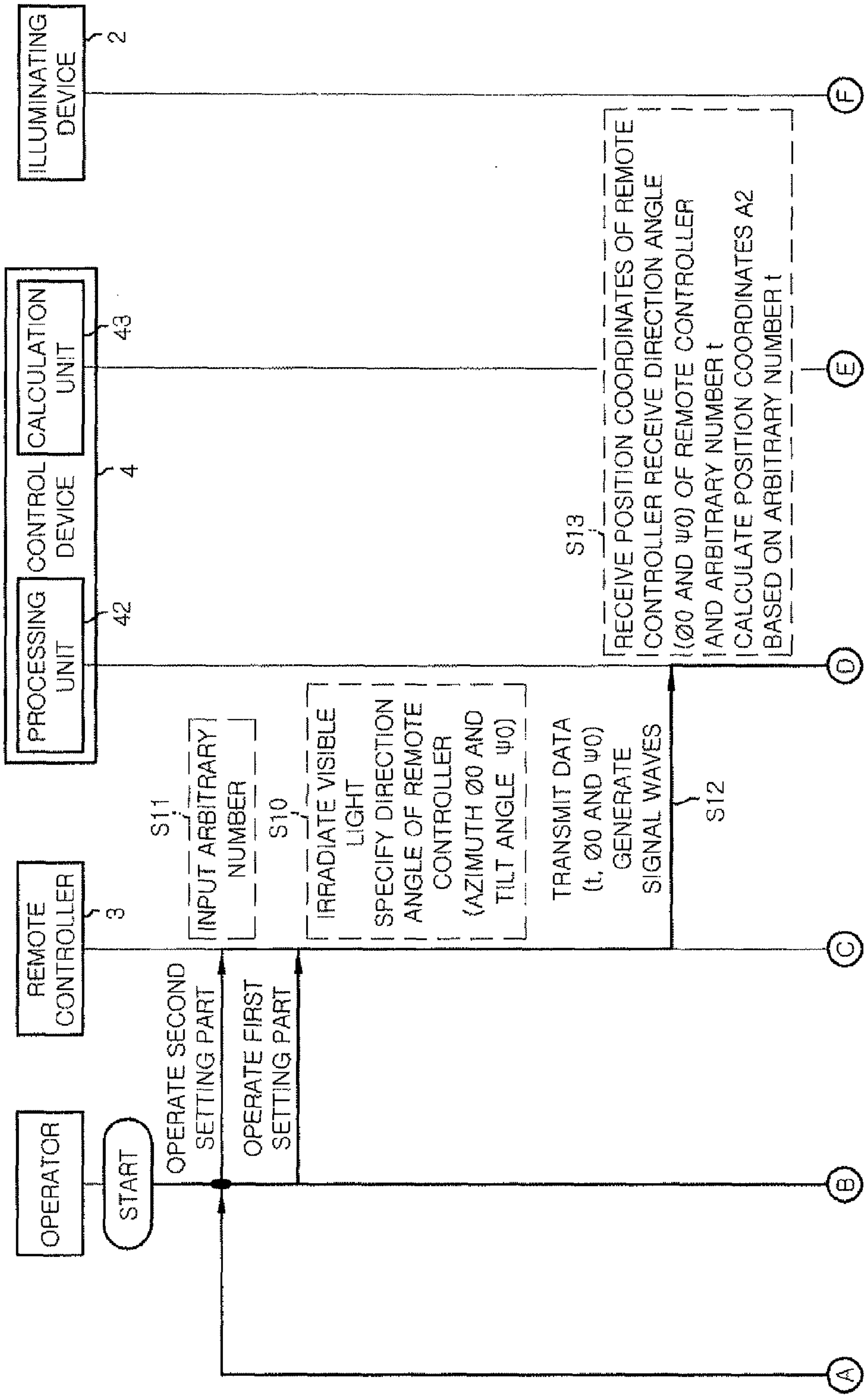
FIGS. 10A and 10B are views for explaining the operation of the remote control system.
Figure 10B:
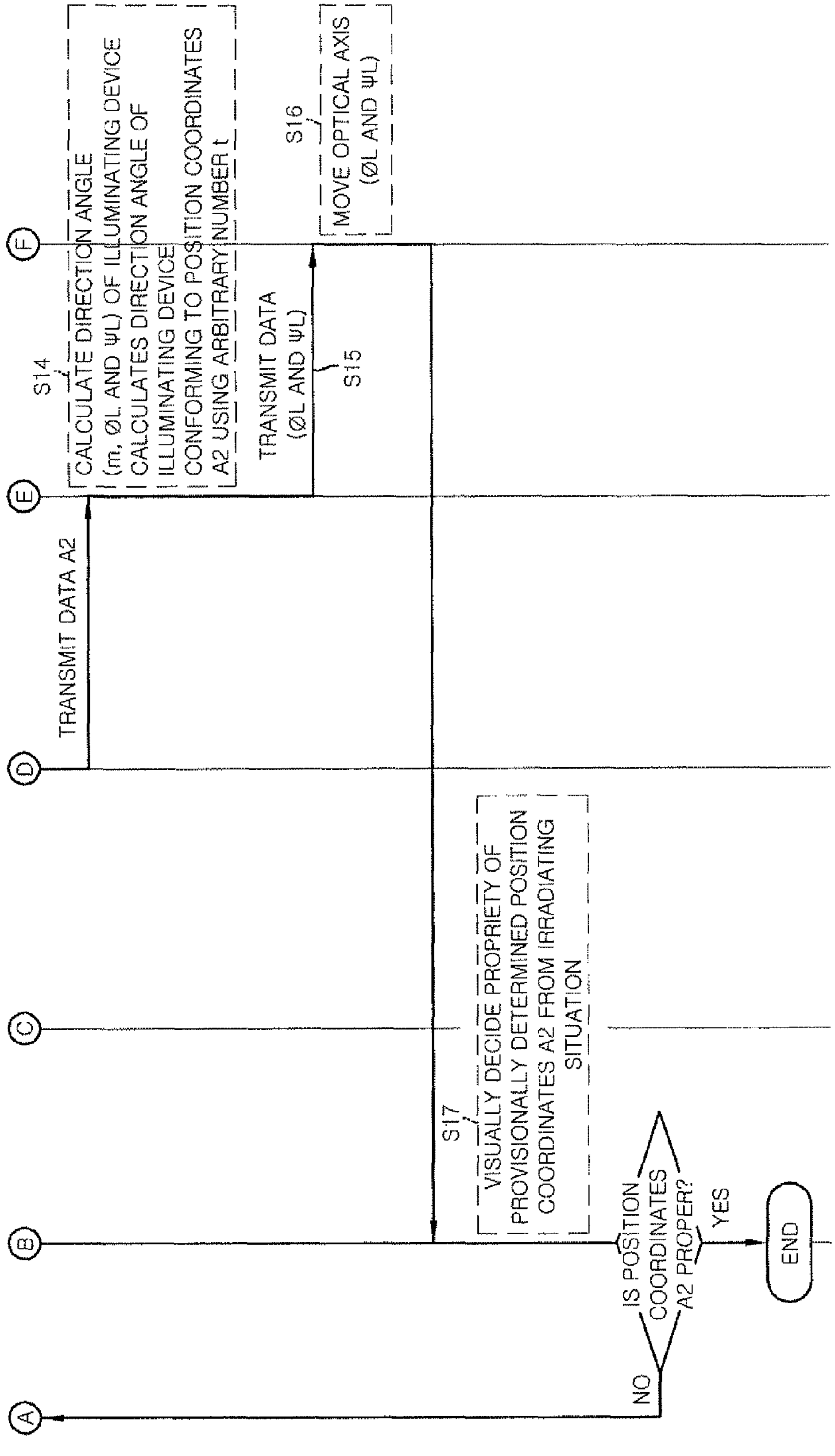

FIG. 9 depicts the operation of the remote control system 1 in a xyz space. L0 denotes the position coordinates of the illuminating device 2 and the direction angle vL (unit vector) signifies the irradiating direction of illumination light. R0 means the position coordinates of the remote controller 3 and the direction angle v0 (unit vector) signifies the irradiating direction of visible light. The control device 4 and the position sensor 5 are arranged near the illuminating device 2. FIGS. 10A and 10B shows the operation sequence of the remote control system 1. If the first setting part is operated by an operator (user), the pointer unit 31 of the remote controller 3 irradiates visible light (step S10).

The operator provisionally determines an arbitrary arbitrary number "t" by operating the second setting part of the remote controller 3 (step S11). The arbitrary number "t" is stored in the storage unit of the control unit 34.

The operator pushes a button of the first setting part of the remote controller 3 for a specified time, e.g., for one second or more, while indicating a position to be irradiated by the illumination light from the lighting device 2 with visible light. The control device 4 averages the detection results of the direction sensor 32 available for the button pushing time or for a specified time period immediately before releasing the button. This averaging procedure helps reduce external noises in the detection results of the direction sensor 32, which are caused by, e.g., the temporary hand vibration. The remote controller 3 transmits a remote control signal containing such data as the direction angle v0 (the azimuth ø0 and the tilt angle ψ0) of the remote controller 3 detected by the direction sensor 32, the arbitrary number "t" set by the second setting part and other information set by the setting unit 33 (step S12). The transmission unit 35 transmits the remote control signal to the control device 4 at a specified interval. The signal wave generating unit 36 generates signal waves at a specified interval.

The control device 4 receives the position coordinates R0 of the remote controller 3 detected by the position sensor 5 (step S13). The reception unit 41 receives the remote control signal containing various kinds of information supplied from the remote controller 3, namely the direction angle v0, the arbitrary number "t" and the information set by the setting unit 33. The processing unit 42 calculates the position coordinates A2 indicated by visible light, using the following equation I.

$$\overrightarrow{A2}=\overrightarrow{R0}+t\overrightarrow{v0}=(R0x,R0y,R0z)+(t\cos ø0\cos\psi 0,t\sin ø0\cos\psi 0,t\sin\psi 0) \quad \text{(Equation I)}$$

The calculation unit 43 calculates the direction angle vL (the pan angle øL and the tilt angle ψL) of the illuminating device 2 (step S14). Based on the position coordinates L0 of the illuminating device 2 stored in the storage unit, the calculation unit 43 calculates the direction angle vL of the illuminating device 2 directed to the position coordinates A2.

The position coordinates A2 are represented by the following equation II.

$$\overrightarrow{A2}=\overrightarrow{L0}+m\overrightarrow{vL}=(L0x,L0y,L0z)+(m\cos øL\cos\psi L,m\sin øL\cos\psi L,m\sin\psi L) \quad \text{(Equation II)}$$

where m is a variable.

The position coordinates A2 represented by the equations I and II are the same in each of the three coordinate components. Thus, three equalities are valid, which makes it possible to solve the variables m, øL and ψL.

The control device 4 transmits the direction angle vL (the pan angle øL and the tilt angle ψL) of the illuminating device 2 calculated by the calculation unit 43 from the communication unit 44 thereof to the communication unit 24 of the illuminating device 2 to be controlled (step S15).

Pursuant to the signal received by the communication unit 24, the drive unit 23 of the illuminating device 2 is controlled so that the optical axis 20 of the illuminating device 2 can be directed to the indicated position. Then, the illumination light is irradiated on the indicated position (step S16).

Based on the irradiating situation of the illumination light, the operator visually decides whether the position coordinates A2 corresponding to the provisionally determined arbitrary number "t" are proper (step S17). The fact that the position coordinates A2 are proper means that the illumination light is irradiated on the desired position. If the position coordinates A2 are not proper (if NO in step S17), the arbitrary number "t" is changed through the operation of the second setting part of the remote controller 3 and the visible light is irradiated through the operation of the first setting part until the position coordinates A2 become proper. The distance from the remote controller 3 to the position coordinates A2, i.e., the unit length "t", is changed by changing the arbitrary number "t". If the position coordinates A2 are proper (if YES in step S17), the setting of light distribution through the change of the arbitrary number "t" comes to an end.

Next, description will be made on the determination of the arbitrary number "t" in the operation of the lighting remote control system 1 (see FIG. 9). The provisional determination of the arbitrary number "t" may be performed by the calculation processing in the calculation unit 43 instead of the user's operation of the setting unit 33. For example, the calculation unit 43 provisionally determines the arbitrary number "t" under the assumption that the position coordinates A2 exist at an intersection point A1 on a specified plane (A2=A1). The specified plane may be, e.g., the floor (the plane of z=0), the ceiling (the plane of z=zmax) or the wall (the plane of x=0 or xmax and the plane of y=0 or ymax). The calculation unit 43 provisionally determines the arbitrary number "t" to be the minimum one of the values found by the following equations III to V.

$$R0z+t\sin\psi 0=0, \quad \text{(Equation III)}$$

which is applicable when the position coordinates A2 and A1 exist on the floor.

$$R0z+t\sin\psi 0=z\mathrm{max}, \quad \text{(Equation IV)}$$

which is applicable when the position coordinates A2 and A1 exist on the ceiling.

$$R0x+t\cos ø0\cos\psi 0=0$$

$$R0x+t\cos ø0\cos\psi 0=x\mathrm{max}$$

$$R0y+t\sin ø0\cos\psi 0=0$$

$$R0y+t\sin ø0\cos\psi 0=y\mathrm{max}, \quad \text{(Equation V)}$$

which is applicable when the position coordinates A2 and A1 exist on the wall.

In the illustrated example, the position coordinates A1 corresponding to the provisionally determined arbitrary number "t" are the coordinates of an intersection point of the straight line extending from the remote controller 3 in the direction of the direction angle v0 and the wall plane y=ymax. The provisionally determined arbitrary number "t" is changed by operating the second setting part of the remote controller 3. For example, if an illumination target 6 is moved from the position near the wall (depicted by a double-dotted line) to the position distant from the wall (depicted by a solid line), the illumination light can be irradiated on the illumination target 6 by changing the arbitrary number "t" to a value smaller than the provisionally determined arbitrary number "t".

With the lighting remote control system 1 described above, the illumination light is irradiated on the position specified based on the direction indicated by the visible light emitted from the user-held remote controller 3, the position coordinates of the remote controller 3 and the unit length "t" set arbitrarily. This makes it possible to easily designate the irradiated position of illumination light to an arbitrary position spaced apart from the user and even to a position hardly accessible by the user. Since the calculation unit 43 can find the irradiating angle of illumination light with respect to a specific position, it is possible to specify the irradiating direction of illumination light with a simple logic. In addition, the unit length "t" is set by the user's operating the setting unit 33 of the remote controller 3. By changing the unit length "t", therefore, it is possible to specify the arbitrary space coordinates and to designate the irradiating position of visible light through the use of the remote controller 3.

Figure 11:
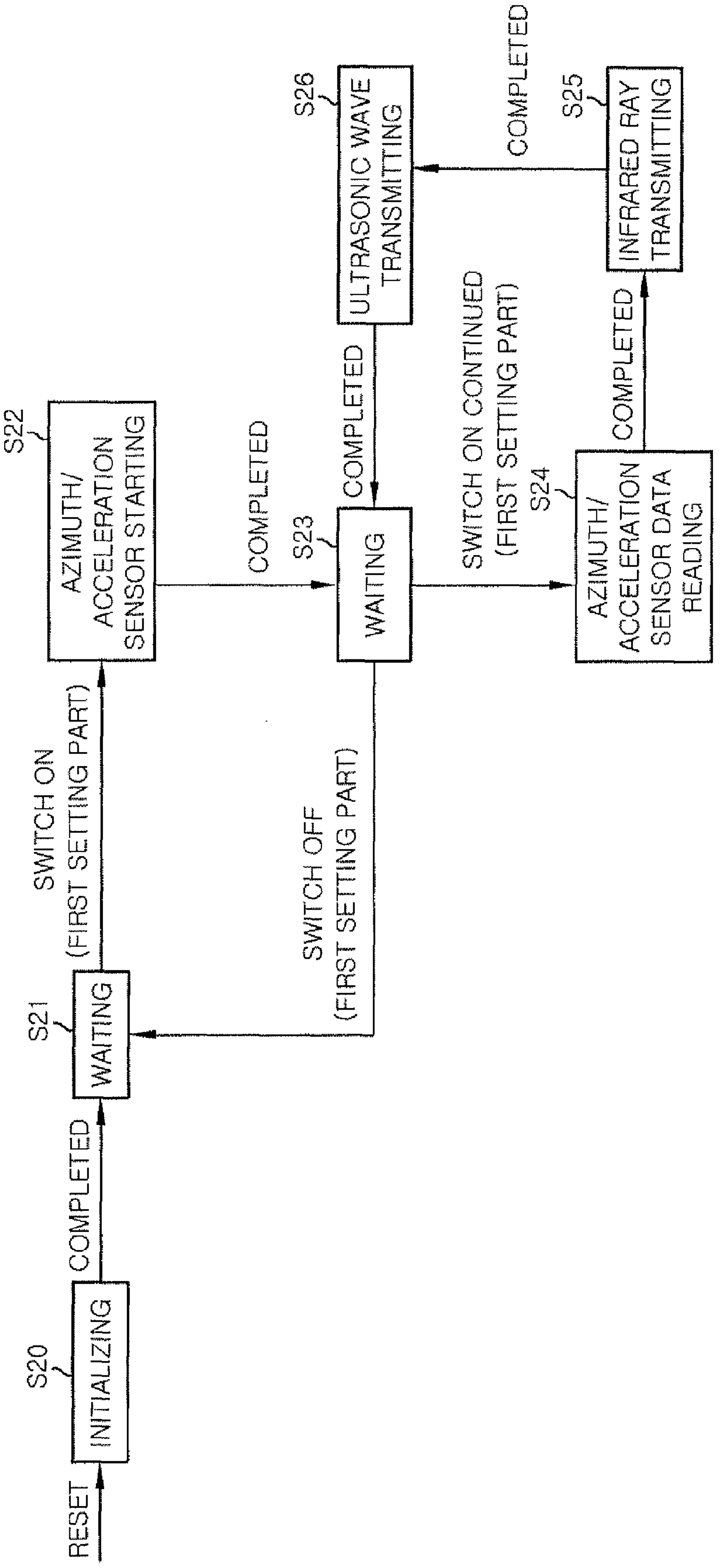
FIG. 11 is a flowchart illustrating the state transition of a remote controller during the operation of the remote control system.

FIG. 11 illustrates the state transition of the remote controller 3 during the operation of the remote control system 1. When reset by the operation of the setting unit 33, the remote controller 3 comes into an "initializing" state S20. If the initialization is completed, the remote controller 3 proceeds to a "waiting" state S21. Upon turning on the switch of the first setting part of the setting unit 33, the remote controller 3 goes to a "direction sensor/acceleration sensor starting" state S22, thereby starting up the direction sensor 32. If the direction sensor 32 is started up, the remote controller 3 proceeds to a "waiting" state S23. Upon turning off the switch of the first setting part, the remote controller 3 comes back to the state S21. In the "waiting" state S21, the remote controller 3 is kept in a power saving mode (standby mode), thereby reducing the electric power consumed by the control unit 34, particularly the CPU thereof. If the switch as the first setting part continues to be turned on in the state S23, the remote controller 3 proceeds to a "direction sensor/acceleration sensor data reading" state S24 to read the data of the direction sensor 32. If the reading of the data of the direction sensor 32 is completed, the remote controller 3 proceeds to an "infrared ray transmitting" state S25 to have the transmission unit 35 transmit infrared rays. If the infrared ray transmission is completed, the remote controller 3 comes into an "ultrasonic wave transmitting" state S26 to cause the signal wave generating unit 36 to transmit ultrasonic waves. If the ultrasonic wave transmission is completed, the remote controller 3 comes back to the state S23.

In this manner, the remote controller 3 is designed to reduce power consumption by using the power saving mode, which assists in prolonging the discharge time of a battery used as a power source.

Figure 12:
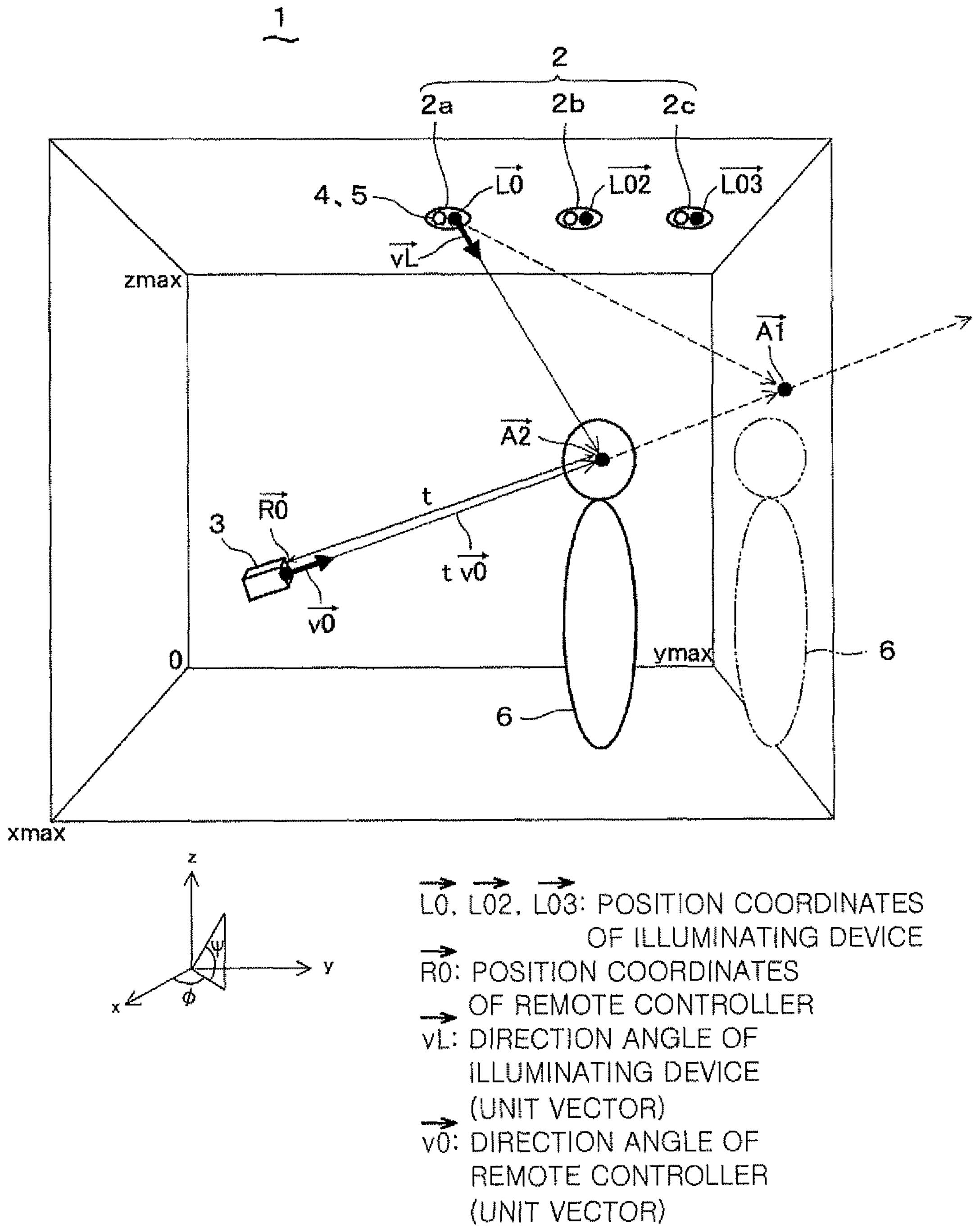
FIG. 12 is a perspective view showing one illustrative operation of the lighting remote control system according to the sixth modified example of the present embodiment.

Next, description will be made on the operation of the lighting remote control system 1 including a plurality of illuminating devices 2 or a plurality of light sources 21, namely the operation of the lighting remote control system 1 according to the sixth modified example (see FIGS. 8A and 83). FIG. 12 shows independent control of each of the illuminating devices 2 as an exemplary operation (independent control type operation) of the remote control system 1. The remote control system 1 includes, e.g., three illuminating devices 2*a*, 2*b* and 2*c*. Each of the illuminating devices 2*a*, 2*b* and 2*c* includes the control device 4 and the position sensor 5. In this remote control system 1, the communication unit 24 of each of the illuminating devices 2*a*, 2*b* and 2*c* and the communication unit 44 of the control device 4 may be omitted and the output of the calculation unit 43 may be inputted to the lighting circuit 22 and the drive unit 23. Each of the illuminating devices 2*a*, 2*b* and 2*c* is identified by the device address "1", "2" or "3" thereof. The position coordinates of the illuminating devices 2*a*, 2*b* and 2*c* are L0, L02 and L03, respectively. In the operation of this remote control system 1, the task of selecting one of the illuminating devices 2*a*, 2*b* and 2*c* as a control target is added to the afore-mentioned operation of the remote control system 1 including one illuminating device 2.

If the illuminating device 2*a* is selected as a control target, the selection of the device address "1" is set by the third setting part of the remote controller 3 (individual setting mode). The reception unit 41 of the control device 4 receives the information set by the remote controller 3. The processing unit 42 determines the illuminating device 2*a* having the device address "1" to be a control target. The calculation unit 43 calculates the direction angle vL (the pan angle øL and the tilt angle ψL) of the illuminating device 2*a*. The control device 4 transmits the direction angle vL to the illuminating device 2*a*. The optical axis of the illuminating device 2*a* is directed to the indicated position A2.

Figure 13:
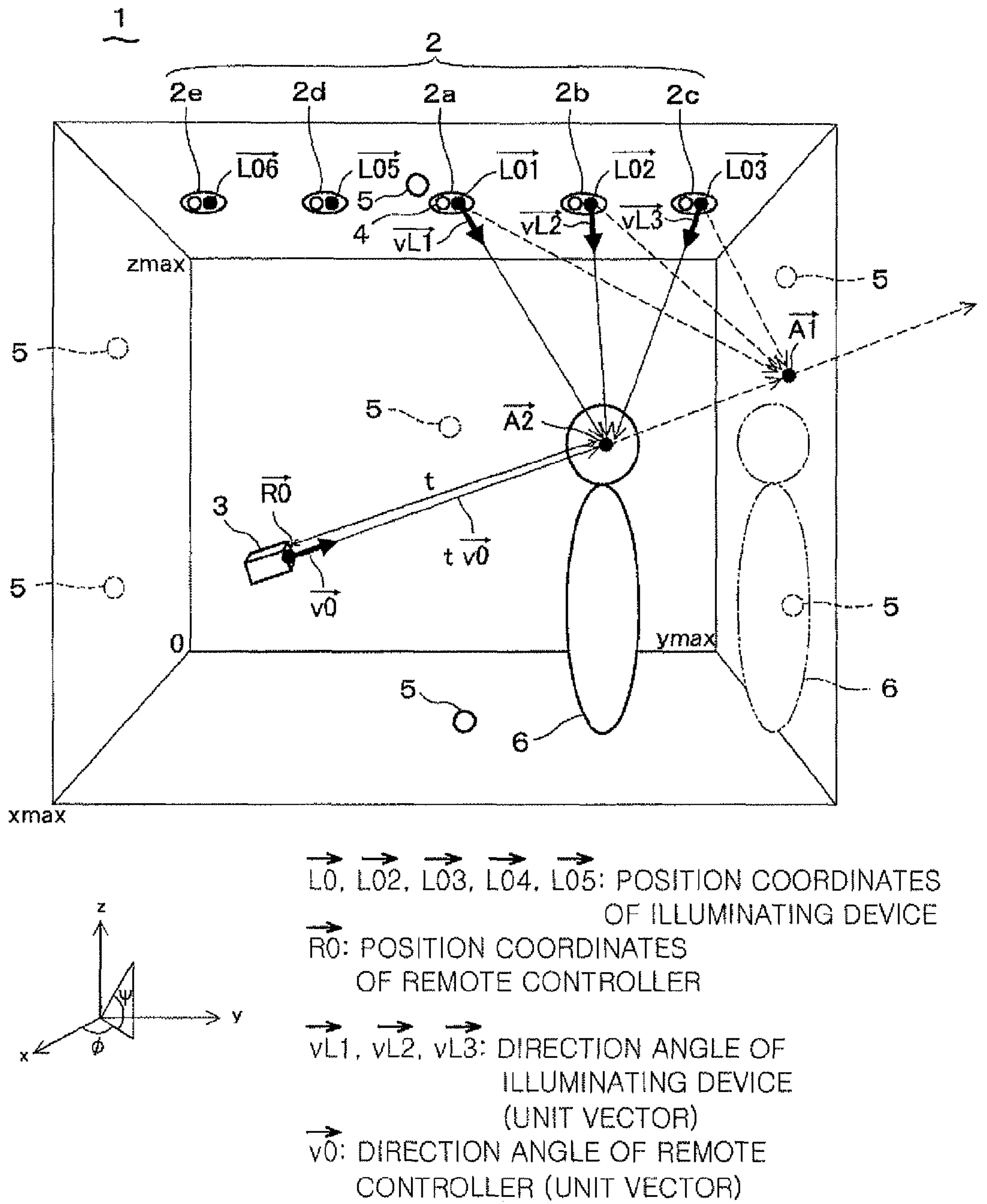
FIG. 13 is a perspective view showing another illustrative operation of the remote control system.

FIG. 13 shows collective control of a plurality of illuminating devices 2 as another exemplary operation (collective control type operation) of the remote control system 1. The remote control system 1 includes, e.g., five illuminating devices 2*a*, 2*b*, 2*c*, 2*d* and 2*e*. Each of the illuminating devices 2*a*, 2*b*, 2*c*, 2*d* and 2*e* includes a control device 4. Position sensors 5 are arranged on the floor and the ceiling. They may be arranged on the wall. The illuminating devices 2*a*, 2*b* and 2*c* belong to a device group "1". The illuminating devices 2*d* and 2*e* belong to another device group. The device addresses of the illuminating devices 2*a*, 2*b* and 2*c* are "1", "2" and "3", respectively. The position coordinates of the illuminating devices 2*a*, 2*b* and 2*c* are L01, L02 and L03, respectively. In the operation of this remote control system 1, the task of selecting some of the illuminating devices 2*a*, 2*b*, 2*c*, 2*d* and 2*e* as control targets is added to the afore-mentioned operation of the remote control system 1 including one illuminating device 2.

If the illuminating devices 2*a*, 2*b* and 2*c* are selected as control targets, the selection of the device group "1" or the device addresses "1", "2" and "3" is set by the third setting part of the remote controller 3 (collective setting mode). The reception unit 41 of the control device 4 receives the information set by the remote controller 3. The processing unit 42 determines the illuminating devices 2*a*, 2*b* and 2*c* having the device addresses "1", "2" and "3" to be control targets. The calculation unit 43 calculates the direction angles vL1, vL2 and vL3 of the illuminating devices 2*a*, 2*b* and 2*c*. The control device 4 transmits the direction angles vL1, vL2 and vL3 corresponding to the device addresses "1", "2" and "3" to the illuminating devices 2*a*, 2*b* and 2*c*. The optical axes of the illuminating devices 2*a*, 2*b* and 2*c* are directed to the indicated position A2 substantially at the same time.

Figure 14:
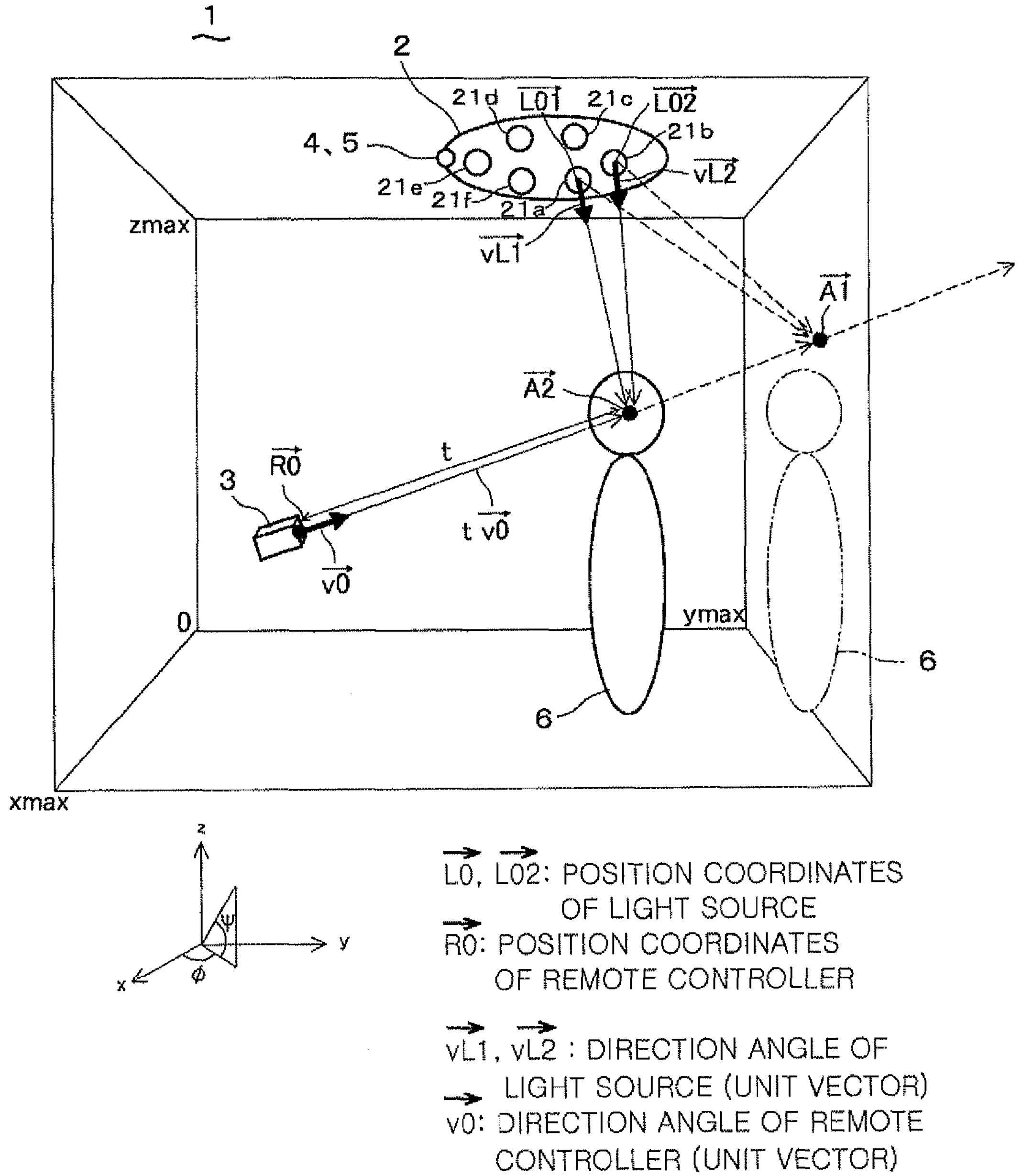
FIG. 14 is a perspective view showing a further illustrative operation of the remote control system.

FIG. 14 shows collective control of a plurality of light sources 21 of the illuminating device 2 as further another exemplary operation (system control type operation) of the remote control system 1. In the remote control system 1, the illuminating device 2 includes, e.g., six light sources 21*a*, 21*b*, 21*c*, 21*d*, 21*e* and 21*f*. The illuminating device 2 has a device address "1". The light sources 21*a*, 21*b*, 21*c*, 21*d*, 21*e* and 21*f* have light source addresses "1", "2", "3", "4", "5" and "6", respectively. The position coordinates of the light sources 21*a* and 21*b* are L01 and L02, respectively. The illuminating device 2 includes the control device 4 and the position sensor 5. The operation of this remote control system 1 includes the task of selecting some of the light sources as control targets in addition to the afore-mentioned operation of the remote control system 1 including one illuminating device 2. The direction angles of the light sources thus selected are controlled by the remote control system 1.

If the light sources 21*a* and 21*b* of the illuminating device 2 are selected as control targets, the selection of the device addresses "1" and the light source addresses "1" and "2" is set by the third setting part of the remote controller 3 (collective setting mode). The reception unit 41 of the control device 4 receives the information set by the remote controller 3. The processing unit 42 determines the light sources 21*a* and 21*b* having the light source addresses "1" and "2", which belong to the illuminating device 2 having the device address "1", to be control targets. The calculation unit 43 calculates the direction angles vL1 and vL2 of the light sources 21*a* and 21*b*. The control device 4 transmits the direction angles vL1 and vL2 corresponding to the device address "1" and the light source addresses "1" and "2" to the illuminating device 2. The optical axes of the light sources 21*a* and 21*b* of the illuminating device 2 are directed to the indicated position A2 substantially at the same time.

Based on the information set by the setting unit 33 of the remote controller 3, the control device 4 causes the communication unit 44 to transmit the light source addresses, the dimming information including the flickering information, and the color temperature information to the illuminating device 2. Pursuant to the information transmitted from the communication unit 44, the illuminating device 2 performs the flickering, dimming and toning of the light sources 21*a* and 21*b* thereof.

Figure 15A:
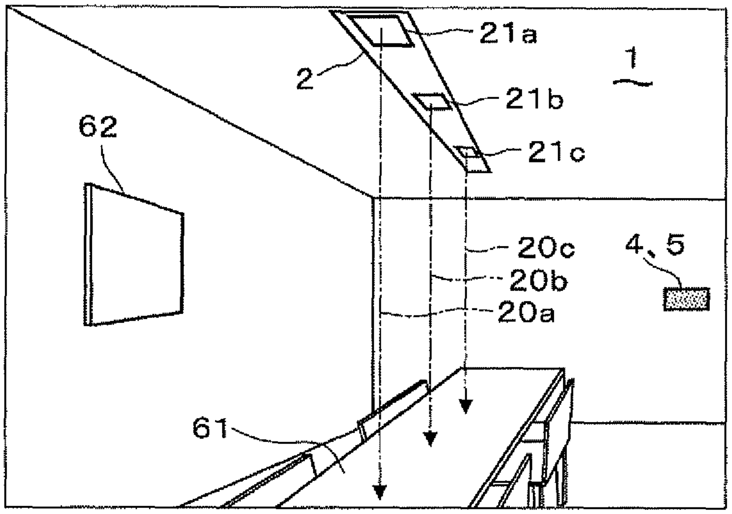
FIGS. 15A, 15B and 15C are perspective views showing one illustrative use of the remote control system.
Figure 15B:
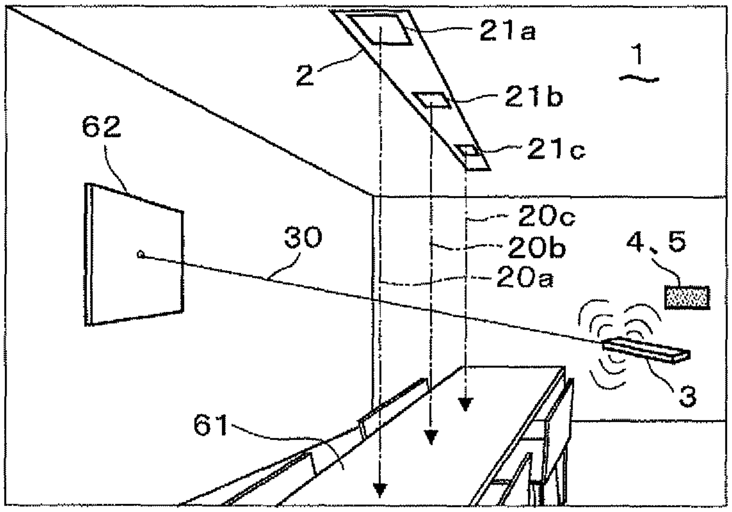
Figure 15C:
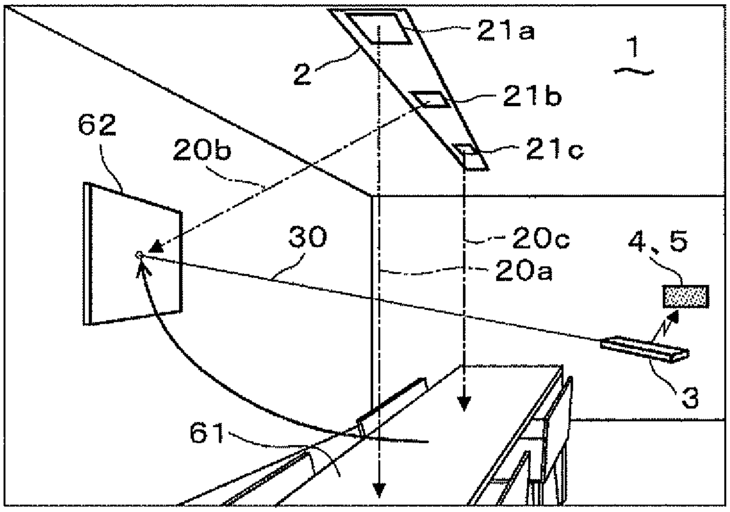

FIGS. 15A, 15B and 15C show an exemplary use of the lighting remote control system 1. The illuminating device 2 includes three light sources 21*a*, 21*b* and 21*c* and is installed on the ceiling of an indoor area. The illuminating device 2 further includes a light transmitting panel arranged at the front side of the light sources 21*a*, 21*b* and 21*c* and a drive unit arranged at the rear side of the light sources 21*a*, 21*b* and 21*c*. A dining table is arranged below the illuminating device 2. A control device 4 and a position sensor 5 are attached to the wall. The operator of the remote controller 3 is not shown in FIGS. 15A, 15B and 15C.

As shown in FIG. 15A, the illuminating device 2 is turned on to irradiate illumination light on the table surface 61 of the dining table with the optical axes 20*a*, 20*b* and 20*c* of the light sources 21*a*, 21*b* and 21*c* directed to the table surface 61.

Referring to FIG. 15B, the remote controller 3 emits visible light 30 with increased directivity, e.g., laser light, if the button of the setting unit 33 is pushed once. The visible light 30 is irradiated on an artwork 62 provided on the wall surface. The light source 21*b* is selected as a control target by operating the setting unit 33 (individual setting).

Referring next to FIG. 15C, if the button of the setting unit 33 is continuously pushed, the information on the detection results of various kinds of sensors is transmitted from the transmission unit 35 of the remote controller 3 to the control device 4. The control device 4 calculates the position (optical-axis guide position) indicated by the visible light 30 to which illumination light is to be irradiated. Then, the control device 4 allows the illumination light to be irradiated to the desired position by directing the optical axis 20*b* thereto and, if necessary, controls the light source 21*b* to have a desired brightness and light color.

Figure 16A:
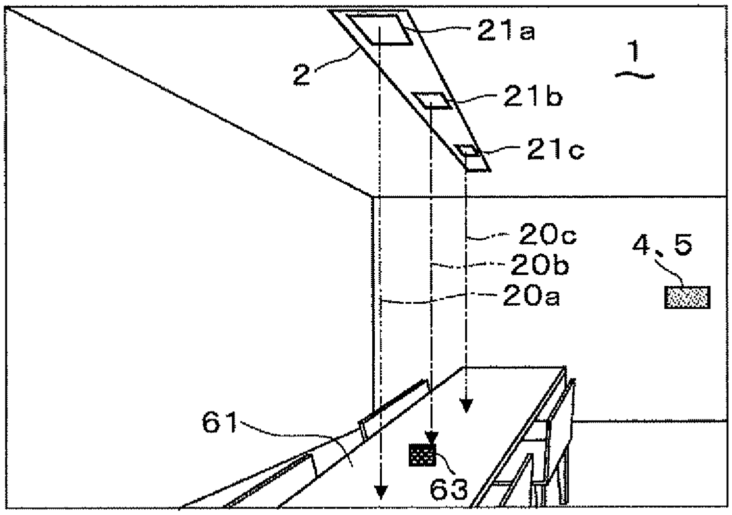
FIGS. 16A, 16B and 16C are perspective views showing another illustrative use of the remote control system.
Figure 16B:
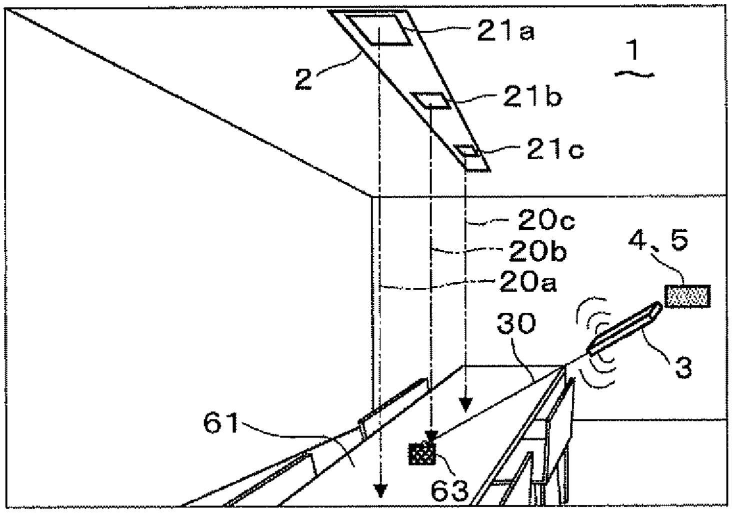
Figure 16C:
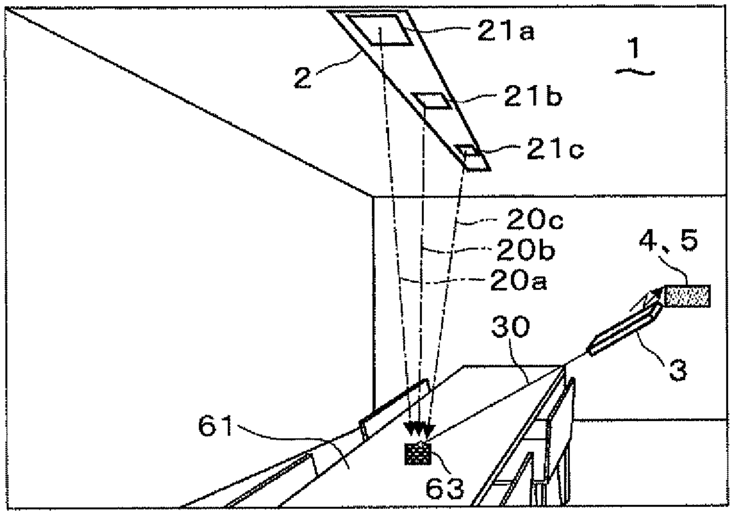

FIGS. 16A, 16B and 16C show another exemplary use of the lighting remote control system 1. Instead of the artwork provided on the wall surface, an article 63 is placed on the table surface 61 of the dining table.

As shown in FIG. 16A, the illuminating device 2 is turned on to irradiate illumination light on the table surface 61 of the dining table with the optical axes 20*a*, 20*b* and 20*c* of the light sources 21*a*, 21*b* and 21*c* directed to the table surface 61. The color of the illumination light is white.

Referring to FIG. 16B, the remote controller 3 emits visible light 30 with increased directivity if the button of the setting unit 33 is pushed once. The visible light 30 is irradiated on the article 63 placed on the table surface 61. The light sources 21*a*, 21*b* and 21*c* are selected as control targets by operating the setting unit 33 (collective setting).

Referring next to FIG. 16C, if the button of the setting unit 33 is continuously pushed, the information on the detection results of various kinds of sensors is transmitted from the transmission unit 35 of the remote controller 3 to the control device 4. The control device 4 calculates the position (optical-axis guide position) indicated by the visible light 30 to which illumination light is to be irradiated. Then, the control device 4 allows the illumination light to be irradiated to the desired position by directing the optical axes 20*a*, 20*b* and 20*c* thereto and controls the light sources 21*a*, 21*b* and 21*c* to have a desired brightness and light color. For example, the color of illumination light of the light source 21*a* is changed from white to red and the color of illumination light of the light source 21*c* is changed from white to blue. This contrast of light colors makes the article 63 look good.

The present invention is not limited to the configurations of the embodiments described above but may be modified in many different forms without departing from the scope of the invention. For example, the remote controller 3 may be detachably attached to the control device 4 in case where the control device 4 is installed on the wall or like places. When not in use, the remote controller 3 is attached to the control device 4. This makes it possible to prevent loss of the remote controller 3. When in use, the remote controller 3 is detached from the control device 4. Preferably, the remote controller 3 is provided with rechargeable secondary battery as a power source and the control device 4 is provided with a charger for charging the remote controller 3. When attaching the remote controller 3 to the control device 4, the remote controller 3 is mounted to the charger of the control device 4. This enables the secondary battery of the remote controller 3 to be charged, thereby preventing exhaustion of the battery power.

What is claimed is:

1. A lighting remote control system, comprising:
an illuminating device for irradiating illumination light in a changeable direction;
a remote controller for irradiating visible light;
a direction sensor for detecting an irradiating direction of the visible light based on a posture including an azimuth and a tilt angle of the remote controller; and
a position sensor for detecting position coordinates of the remote controller,
wherein the illuminating device is designed to irradiate the illumination light on a specified position that is a set distance from the position coordinates of the remote controller to the specified position, the specified position being specified based on the position coordinates of the remote controller detected by the position sensor, the irradiating direction of the visible light detected by the direction sensor, and the set distance from the position coordinates of the remote controller to the specified position.

2. The system of claim 1, further comprising:
a calculation unit for finding an irradiating angle of the illumination light based on the position coordinates of the remote controller, the irradiating direction of the visible light and the distance from the position coordinates of the remote controller to the specified position.

3. The system of claim 1, wherein the remote controller includes a setting unit for enabling a user to arbitrarily set the distance from the position coordinates of the remote controller to the specified position.

4. The system of claim 2, wherein the remote controller includes a setting unit for enabling a user to arbitrarily set the distance from the position coordinates of the remote controller to the specified position.

* * * * *